US007710415B2

(12) United States Patent
Jennings, Jr. et al.

(10) Patent No.: US 7,710,415 B2
(45) Date of Patent: *May 4, 2010

(54) SYSTEMS AND METHODS FOR THREE-DIMENSIONAL MODELING

(75) Inventors: Ralph E. Jennings, Jr., Stow, MA (US); Thomas Harold Massie, Windham, NH (US); Bradley A. Payne, Andover, MA (US); Walter C. Shannon, III, West Newton, MA (US)

(73) Assignee: Sensable Technologies, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/179,038

(22) Filed: Jul. 11, 2005

(65) Prior Publication Data
US 2006/0109269 A1 May 25, 2006

Related U.S. Application Data

(63) Continuation of application No. 10/017,148, filed on Dec. 14, 2001, now Pat. No. 6,958,752.

(60) Provisional application No. 60/260,278, filed on Jan. 8, 2001.

(51) Int. Cl.
*G06T 17/00* (2006.01)
(52) U.S. Cl. ............... 345/420; 345/419; 345/421; 345/424; 345/427; 345/473
(58) Field of Classification Search ............ 345/420, 345/424, 419, 421, 427, 473
See application file for complete search history.

(56) References Cited

U.S. PATENT DOCUMENTS 2,475,484 A 7/1949 DeNise
(Continued)

FOREIGN PATENT DOCUMENTS

EP 0 915 434 A2 5/1999
(Continued)

OTHER PUBLICATIONS

Sannier et al. "A user-friendly texture fitting methodology for virtual humans", IEEE 1997.*
(Continued)

*Primary Examiner*—Kimbinh T Nguyen
(74) *Attorney, Agent, or Firm*—Goodwin Procter LLP

(57) ABSTRACT

Systems and methods for modifying a virtual object stored within a computer. The systems and methods allow virtual object modifications that are otherwise computationally inconvenient. The virtual object is represented as a volumetric representation. A portion of the volumetric model is converted into an alternative representation. The alternative representation can be a representation having a different number of dimensions from the volumetric representations. A stimulus is applied to the alternative representation, for example by a user employing a force-feedback haptic interface. The response of the alternative representation to the stimulus is calculated. The change in shape of the virtual object is determined from the response of the alternative representation. The representations of the virtual object can be displayed at any time for the user. The user can be provided a force-feedback response. Multiple stimuli can be applied in succession. Multiple alternative representations can be employed in the system and method.

15 Claims, 10 Drawing Sheets

U.S. PATENT DOCUMENTS

| | | |
|---|---|---|
| 3,168,203 A | 2/1965 | Gallistel |
| 3,263,824 A | 8/1966 | Jones et al. |
| 3,449,008 A | 6/1969 | Colechia |
| 3,531,868 A | 10/1970 | Stevenson |
| 3,618,786 A | 11/1971 | Fick |
| 3,637,092 A | 1/1972 | George et al. |
| 3,920,972 A | 11/1975 | Corwin et al. |
| 3,944,798 A | 3/1976 | Eaton |
| 4,062,455 A | 12/1977 | Flatau |
| 4,150,803 A | 4/1979 | Fernandez |
| 4,216,467 A | 8/1980 | Colston |
| 4,302,138 A | 11/1981 | Zarudiansky |
| 4,367,532 A | 1/1983 | Crum et al. |
| 4,420,808 A | 12/1983 | Diamond et al. |
| 4,521,685 A | 6/1985 | Rebman |
| 4,604,016 A | 8/1986 | Joyce |
| 4,632,341 A | 12/1986 | Repperger et al. |
| 4,638,798 A | 1/1987 | Shelden et al. |
| 4,653,011 A | 3/1987 | Iwano |
| 4,654,648 A | 3/1987 | Herrington et al. |
| 4,655,673 A | 4/1987 | Hawkes |
| 4,661,032 A | 4/1987 | Arai |
| 4,670,851 A | 6/1987 | Murakami et al. |
| 4,676,002 A | 6/1987 | Slocum |
| 4,680,519 A | 7/1987 | Chand et al. |
| 4,686,522 A | 8/1987 | Hernandez et al. |
| 4,703,443 A | 10/1987 | Moriyasu |
| 4,729,098 A | 3/1988 | Cline et al. |
| 4,769,763 A | 9/1988 | Trieb et al. |
| 4,791,934 A | 12/1988 | Brunnett |
| 4,795,296 A | 1/1989 | Jau |
| 4,800,721 A | 1/1989 | Cemenska et al. |
| 4,819,195 A | 4/1989 | Bell et al. |
| 4,823,634 A | 4/1989 | Culver |
| 4,837,734 A | 6/1989 | Ichikawa et al. |
| 4,839,838 A | 6/1989 | LaBiche et al. |
| 4,853,874 A | 8/1989 | Iwamoto et al. |
| 4,888,538 A | 12/1989 | Dimitrov et al. |
| 4,893,981 A | 1/1990 | Yoshinada et al. |
| 4,907,970 A | 3/1990 | Meenen, Jr. |
| 4,907,973 A | 3/1990 | Hon |
| 4,942,538 A | 7/1990 | Yuan et al. |
| 4,945,305 A | 7/1990 | Blood |
| 4,945,501 A | 7/1990 | Bell et al. |
| 4,961,138 A | 10/1990 | Gorniak |
| 4,973,111 A | 11/1990 | Haacke et al. ............... 324/309 |
| 4,973,215 A | 11/1990 | Karlen et al. |
| 4,982,504 A | 1/1991 | Söderberg et al. |
| 4,988,981 A | 1/1991 | Zimmerman et al. |
| 5,004,391 A | 4/1991 | Burdea |
| 5,007,300 A | 4/1991 | Siva |
| 5,018,922 A | 5/1991 | Yoshinada et al. |
| 5,019,761 A | 5/1991 | Kraft |
| 5,038,089 A | 8/1991 | Szakaly |
| 5,040,306 A | 8/1991 | McMurtry et al. |
| 5,044,956 A | 9/1991 | Behensky et al. |
| 5,053,975 A | 10/1991 | Tsuchihashi et al. |
| 5,072,361 A | 12/1991 | Davis et al. |
| 5,088,046 A | 2/1992 | McMurtry |
| 5,088,055 A | 2/1992 | Oyama |
| 5,103,404 A | 4/1992 | McIntosh |
| 5,105,367 A | 4/1992 | Tsuchihashi et al. |
| 5,116,051 A | 5/1992 | Moncrief et al. |
| 5,116,180 A | 5/1992 | Fung et al. |
| 5,130,632 A | 7/1992 | Ezawa et al. |
| 5,131,844 A | 7/1992 | Marinaccio et al. |
| 5,142,931 A | 9/1992 | Menahem |
| 5,143,505 A | 9/1992 | Burdea et al. |
| 5,184,319 A | 2/1993 | Kramer |
| 5,185,561 A | 2/1993 | Good et al. |
| 5,189,806 A | 3/1993 | McMurtry et al. |
| 5,193,963 A | 3/1993 | McAffee et al. |
| 5,204,824 A | 4/1993 | Fujimaki |
| 5,220,260 A | 6/1993 | Schuler |
| 5,223,776 A | 6/1993 | Radke et al. |
| 5,237,647 A | 8/1993 | Roberts et al. |
| 5,239,246 A | 8/1993 | Kim |
| 5,255,211 A | 10/1993 | Redmond |
| 5,264,768 A | 11/1993 | Gregory et al. |
| 5,266,875 A | 11/1993 | Slotine et al. |
| 5,333,257 A | 7/1994 | Merrill et al. |
| 5,354,162 A | 10/1994 | Burdea et al. |
| 5,382,885 A | 1/1995 | Salcudean et al. |
| 5,389,865 A | 2/1995 | Jacobus et al. |
| 5,396,265 A | 3/1995 | Ulrich et al. |
| 5,414,337 A | 5/1995 | Schuler |
| 5,429,140 A | 7/1995 | Burdea et al. |
| 5,438,529 A | 8/1995 | Rosenberg et al. |
| 5,446,834 A | 8/1995 | Deering |
| 5,459,382 A | 10/1995 | Jacobus et al. |
| 5,482,051 A | 1/1996 | Reddy et al. |
| 5,489,830 A | 2/1996 | Fernandez |
| 5,497,452 A | 3/1996 | Shimizu et al. |
| 5,506,785 A | 4/1996 | Blank et al. .................... 700/98 |
| 5,515,078 A | 5/1996 | Greschler et al. |
| 5,555,894 A | 9/1996 | Doyama et al. |
| 5,559,412 A | 9/1996 | Schuler |
| 5,576,727 A | 11/1996 | Rosenberg et al. |
| 5,587,937 A | 12/1996 | Massie et al. |
| 5,589,854 A | 12/1996 | Tsai |
| D377,932 S | 2/1997 | Schena et al. |
| 5,623,582 A | 4/1997 | Rosenberg |
| 5,623,642 A | 4/1997 | Katz et al. |
| 5,625,576 A | 4/1997 | Massie et al. |
| 5,629,594 A | 5/1997 | Jacobus et al. |
| 5,642,469 A | 6/1997 | Hannaford et al. |
| 5,659,493 A | 8/1997 | Kiridena et al. |
| 5,666,138 A | 9/1997 | Culver |
| 5,691,898 A | 11/1997 | Rosenberg et al. |
| 5,694,013 A | 12/1997 | Stewart et al. |
| 5,701,140 A | 12/1997 | Rosenberg et al. |
| 5,721,566 A | 2/1998 | Rosenberg et al. |
| 5,724,264 A | 3/1998 | Rosenberg et al. |
| 5,731,804 A | 3/1998 | Rosenberg |
| 5,734,373 A | 3/1998 | Rosenberg et al. |
| 5,737,505 A | 4/1998 | Shaw et al. |
| 5,739,811 A | 4/1998 | Rosenberg et al. |
| 5,742,278 A | 4/1998 | Chen et al. |
| 5,751,289 A | 5/1998 | Myers |
| 5,754,023 A | 5/1998 | Roston et al. |
| 5,767,839 A | 6/1998 | Rosenberg |
| 5,769,640 A | 6/1998 | Jacobus et al. |
| 5,774,130 A | 6/1998 | Horikawa et al. |
| 5,784,542 A | 7/1998 | Ohm et al. |
| 5,790,108 A | 8/1998 | Salcudean et al. |
| 5,798,752 A | 8/1998 | Buxton et al. |
| 5,800,177 A | 9/1998 | Gillio |
| 5,800,178 A | 9/1998 | Gillio |
| 5,800,179 A | 9/1998 | Bailey |
| 5,802,353 A | 9/1998 | Avila et al. |
| 5,803,738 A | 9/1998 | Latham |
| 5,805,140 A | 9/1998 | Rosenberg et al. |
| 5,821,920 A | 10/1998 | Rosenberg et al. |
| 5,825,308 A | 10/1998 | Rosenberg |
| 5,828,197 A | 10/1998 | Martin et al. |
| 5,831,408 A | 11/1998 | Jacobus et al. |
| 5,844,392 A | 12/1998 | Peurach et al. |
| 5,847,956 A | 12/1998 | Bronfeld et al. |
| 5,859,934 A | 1/1999 | Green |
| 5,872,438 A | 2/1999 | Roston |
| 5,873,106 A | 2/1999 | Joseph |
| 5,880,714 A | 3/1999 | Rosenberg et al. |
| 5,881,178 A | 3/1999 | Tsykalov et al. ............ 382/260 |
| 5,882,206 A | 3/1999 | Gillio |

| | | |
|---|---|---|
| 5,889,670 A | 3/1999 | Schuler et al. |
| 5,898,599 A | 4/1999 | Massie et al. |
| 5,903,270 A | 5/1999 | Gentry et al. |
| 5,903,886 A | 5/1999 | Heimlich et al. |
| 5,907,487 A | 5/1999 | Rosenberg et al. |
| 5,913,727 A | 6/1999 | Ahdoot |
| 5,929,607 A | 7/1999 | Rosenberg et al. |
| 5,929,846 A | 7/1999 | Rosenberg et al. |
| 5,956,484 A | 9/1999 | Rosenberg et al. |
| 5,963,212 A | 10/1999 | Bakalash |
| 5,973,678 A | 10/1999 | Stewart et al. |
| 5,988,862 A | 11/1999 | Kacyra et al. |
| 6,040,840 A | 3/2000 | Koshiba et al. ............. 345/441 |
| 6,061,004 A | 5/2000 | Rosenberg ................... 341/20 |
| 6,064,394 A | 5/2000 | Morrison |
| 6,084,587 A | 7/2000 | Tarr et al. |
| 6,111,577 A | 8/2000 | Zilles et al. |
| 6,131,097 A | 10/2000 | Peurach et al. |
| 6,191,796 B1 | 2/2001 | Tarr |
| 6,211,848 B1 | 4/2001 | Plesniak et al. |
| 6,219,032 B1 | 4/2001 | Rosenberg et al. .......... 345/157 |
| 6,226,003 B1 | 5/2001 | Akeley |
| 6,308,144 B1 | 10/2001 | Bronfeld et al. |
| 6,337,678 B1 | 1/2002 | Fish |
| 6,342,880 B2 | 1/2002 | Rosenberg et al. |
| 6,369,834 B1 | 4/2002 | Zilles et al. |
| 6,384,822 B1 | 5/2002 | Bilodeau et al. |
| 6,405,158 B1 | 6/2002 | Massie et al. |
| 6,417,638 B1 | 7/2002 | Guy et al. |
| 6,421,048 B1 | 7/2002 | Shih et al. |
| 6,552,722 B1 | 4/2003 | Shih et al. |
| 6,608,631 B1 | 8/2003 | Milliron |
| 6,671,651 B2 | 12/2003 | Goodwin et al. |
| 6,707,458 B1 | 3/2004 | Leather et al. .............. 345/582 |
| 6,867,770 B2 * | 3/2005 | Payne .......................... 345/420 |
| 6,958,752 B2 | 10/2005 | Jennings, Jr. et al. |
| 7,212,203 B2 | 5/2007 | Payne |
| 2002/0075283 A1 | 6/2002 | Payne |
| 2002/0089500 A1 | 7/2002 | Jennings et al. |
| 2002/0154132 A1 | 10/2002 | Dumesny et al. ............ 345/582 |
| 2002/0158842 A1 | 10/2002 | Guy et al. |
| 2003/0117411 A1 | 6/2003 | Fujiwara et al. |
| 2003/0128208 A1 | 7/2003 | Shih et al. |
| 2003/0191554 A1 | 10/2003 | Russell et al. |
| 2005/0060130 A1 | 3/2005 | Shapiro et al. ................. 703/2 |
| 2005/0062738 A1 | 3/2005 | Handley et al. ............. 345/419 |
| 2005/0168460 A1 | 8/2005 | Razdan et al. .............. 345/419 |

FOREIGN PATENT DOCUMENTS

| | | |
|---|---|---|
| GB | 2389764 | 12/2003 |
| GB | 2410351 | 7/2005 |
| WO | WO 95/02801 | 1/1995 |
| WO | WO 96/16397 | 5/1996 |
| WO | WO 96/22591 | 7/1996 |
| WO | WO 96/42078 | 12/1996 |
| WO | WO 97/06410 | 2/1997 |
| WO | WO 97/12337 | 4/1997 |
| WO | WO 97/12357 | 4/1997 |
| WO | WO 97/19440 | 5/1997 |
| WO | WO 97/21160 | 6/1997 |
| WO | WO 97/44775 | 11/1997 |
| WO | WO 98/06024 | 2/1998 |
| WO | WO 98/26342 | 6/1998 |
| WO | WO 98/30951 | 7/1998 |
| WO | WO 98/58308 | 12/1998 |
| WO | WO 98/58323 | 12/1998 |
| WO | WO 99/10872 | 3/1999 |

OTHER PUBLICATIONS

Thomas et al. "Warping Distributed System Configurations", Published May 1998.*
Thomas Warping to Enhance 3D User Interfaces:, Published 1998.*
Adachi, "Touch and Trace on the Free-Form Surface of Virtual Object," Proceedings of IEEE Virtual Reality Annual International Symposium, Sep. 18-22, 1993, Seattle WA, pp. 162-168.
Agrawala et al., "3D Painting on Scanned Surfaces", Stanford University, 1995, pp. 145-150.
Alejandre, "What is a Tessellation?" *The Math Forum, Drexel University*, printed Jul. 29, 2003, http://mathforum.org/sum95/suzanne/whattess.html, 4 pgs.
Altmann, "About Nonuniform Rational B-Splines—NURBS," Worcester Polytechnic Institute, printed Jul. 29, 2003, http://www.cs.wpi.edu/~matt/courses/cs563/talks/nurbs.html, 6 pgs.
Atkinson et al., "Computing with Feeling" Comput. & Graphics, vol. 2, 1977, pp. 97-103.
Avila et al., "A Haptic Interaction Method for Volume Visualization," GE Corporate Research & Development, Schenectady, NY, pp. 1-9 (1996).
Barr, "Global and Local Deformations of Solid Primitives"; Computer Graphics; vol. 18, No. 3, pp. 21-30 (Jul. 1984).
Bentley, "Rendering Cubic Bezier Patches," Worcester Polytechnic Institute, printed Nov. 17, 2003, http://www.cs.wpi.edu/~matt/courses/cs563/talks/surface/bez_surf.html, 10 pgs.
Bergamasco, "Design of Hand Force Feedback Systems for Glove-like Advanced Interfaces", IEEE, Sep. 1992, pp. 286-293.
Birn, "Tutorial: NURBS Head Modeling," printed Jul. 29, 2003, http://www.3drender.com/jbirn/ea/HeadModel.html, 5 pgs.
Blinn, "Simulation of Wrinkled Surfaces," Computer Graphics, vol. 12-3, Aug. 1978, pp. 286-292.
Brooks et al., "Project GROPE—Haptic Displays for Scientific Visualization," Computer Graphics, vol. 24, No. 4, Aug. 1990, pp. 177-185.
Burdea, "Force And Touch Feedback For Virtual Reality," John Wiley and Sons, Inc., New York, New York, pp. 190-193 (1996).
Colgate et al., "Factors Affecting the Z-Width of a Haptic Display," published by IEEE Computer Society Press, Los Alamitos, California, in Proceedings: 1994 IEEE International Conference On Robotics and Automation, held May 8-13, 1994 in San Diego, California, vol. 4, 1994, pp. 3205-3210.
Colgate et al., "Implementation of Stiff Virtual Walls in Force Reflecting Interfaces," IEEE Virtual Reality Annual International Symposium (Seattle, WA), pp. 202-208 (Sep. 18-22, 1993).
Colgate et al., "Issues in the Haptic Display of Tool Use," published by IEEE Computer Society Press, Los Alamitos, California, in Proceedings: 1995 IEEE/RSJ International Conference on Intelligent Robots and Systems—Human Robot Interaction and Cooperative Robots, held Aug. 5-9, 1995 in Pittsburgh, Pennsylvania, 1995, pp. 140-145.
Decaudin, "Geometric Deformation by Merging a 3D-Object with a Simple Shape," Graphics Interface '96 Proceedings (Toronto, Canada), 6 pgs. (May 21-24, 1996).
Dworkin et al., "A New Model for Efficient Dynamic," Fourth Eurographics Animation and Simulation Workshop Proceedings Eurographics Technical Report Series, ISSN 1017-4656, Sep. 4-5, 1993, pp. 135-147.
Elhajj et al., "Supermedia-Enhanced Internet-Based Telerobotics," Proceedings of the IEEE, vol. 91, No. 3, pp. 396-421 (Mar. 2003).
Farin, "NURBS," printed Nov. 17, 2003, www.eros.cagd.eas.asu.edu/~farin/rbook/toc.html, 2 pgs.
Foskey et al, "*ArtNova*: Touch-Enabled 3D Model Design," Proceedings of IEEE Virtual Reality 2002, Mar. 24-28, 2002, Orlando, Florida pp. 119-126.
Fuentes et al., "The Virtual Tool Approach to Dextrous Telemanipulation," Proceedings of the 1996 IEEE International Conference on Robotics and Automation (Minneapolis, MN), pp. 1700-1705 (Apr. 1996).
Galyean, "Sculpting: An Interactive Volumetric Modeling Technique," Computer Graphics (SIGGRAPH '91 Las Vegas), vol. 25, No. 4, pp. 267-274 (Jul. 1991).
Gu et al., "Global Conformal Surface Parameterization," Eurographics Symposium on Geometry Processing (2003), 12 pgs.
Hashimoto et al., "Dynamic Force Simulator for Force Feedback Human-Machine Interaction", IEEE, Sep. 1993, pp. 209-215.
Hirata et al., "3-Dimensional Interface Device for Virtual Work Space," Proceedings of the 1992 IEEE, Jul. 7-10, 1992, pp. 889-896.

Hirota et al., "Development of Surface Display," Proceedings of the Virtual Reality Annual International Symposium (Seattle), pp. 256-262 (Sep. 18-23, 1993).

Hirota et al., "Providing Force Feedback in Virtual Environments", IEEE, Sep. 1995, pp. 22-30.

Howe et al., "Task Performance with a Dextrous Teleoperated Hand System," Telemanipulator Technology, Nov. 1992, Proceedings of SPIE, vol. 1833, pp. 1-9.

Immersion Corporation, "Impulse Engine 2000," http://www.immerse.com/WWWpages/IE2000pg.htm, 2 pages (1997).

Immersion Corporation, "Laparoscopic Impulse Engines: A New Force Feedback Surgical Simulation Tool", Immersion Corporation, 1995. http://www.immerse.com/wwwpages/lapIEpg.htm.

Immersion Corporation, "The Impulse Engines", 1 page, Immersion Corporation, 1996.

Immersion Corporation, "Virtual Laparoscopic Interface", Immersion Corporation, 1995, 1 pg.

Inoue et al., "Parallel Manipulator," Proceedings of 3rd Robotics Research: The Third International Symposium, Faugeras & Giralt, eds., MIT Press 1986.

Ishii et al., "A 3D Interface Device with Force Feedback: A Virtual Work Space for Pick-and-Place Tasks", IEEE, Sep. 1993, pp. 331-335.

Iwata, "Artificial Reality with Force-feedback: Development of Desktop Virtual Space with Compact Master Manipulator," Computer Graphics (SIGGRAPH '90 Dallas), vol. 24, No. 4, pp. 165-170 (Aug. 1990).

Iwata, "Pen-based Haptic Virtual Environment," Proceedings of IEEE Virtual Reality Annual International Symposium, (Sep. 18-22, 1993, Seattle, WA), pp. 287-292.

Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T 1Z4, Canada, Oct. 19, 1993, pp. 1-27.

Komerska et al., "Haptic Interface for Center-of-Workspace Interaction: Demonstration Paper," *Haptics Interfaces for Virtual Environments and Teleoperator Systems* (2002), pp. 352-353.

Komerska et al., "Haptic Task Constraints for 3D Interactions," *Proceedings, IEEE Haptics Interfaces for Virtual Environments and Teleoperator Systems*, (Mar. 22-23, 2003), pp. 270-277.

Kotoku et al., "A Force Display Algorithm for Virtual Environments," SICE, pp. 347-355, 1992.

Kraft Telerobotics, Inc., "GRIPS Master/Slave Manipulator System," 1988.

Lewis, "Electronic Pen With Its Own Eraser", Personal Computers, Jul. 1995, p. C8.

Luo et al., "Networked Intelligent Robots Through the Internet: Issues and Opportunities," Proceedings of the IEEE, vol. 91, No. 3, pp. 371-382 (Mar. 2003).

Marcus et al., "EXOS Research on Master Controllers for Robotic Devices," Fifth Annual Workshop on Space Operations Applications and Research (SOAR '91) pp. 238-245, Jul. 1991.

Massie, "Design of a Three Degree of Freedom Force-Reflecting Haptic Interface", Massachusetts Institute of Technology; Bachelor of Science in Electrical Science and Engineering Thesis, May 1993, pp. 1-38.

Massie, "Initial Haptic Explorations with the Phantom: Virtual Touch Through Point Interaction", Massachusetts Institute of Technology Master of Science Thesis, Feb. 1996, pp. 1-49. (not admitted as prior art).

McAffee et al, "Teleoperator Subsystem/Telerobot Demonstrator," Force Reflecting Hand Controller Equipment Manual, Jet Propulsion Laboratory, Jan. 1988.

Miller et al., "The Design of 3D Haptic Widgets," Proceedings of the 1999 Symposium on Interactive 3D Graphics Conference Proceedings, (1999) pp. 1-6.

Millman et al., "A System for the Implementation and Kinesthetic Display of Virtual Environments," Telemanipulator Technology, Proceedings of 1992 SPIE, vol. 1833, pp. 49-56.

Minsky et al., "Feeling and Seeing: Issues in Force Display," Computer Graphics, vol. 24, No. 2, Mar. 1990, pp. 235-270.

Minsky, "Computational Haptics: The Sandpaper System for Synthesizing Texture for a Force-Feedback Display," Massachusetts Institute of Technology Ph.D. Thesis, Jun. 1995, pp. 1-217.

Morgenbesser, "Force Shading for Shape Perception in Haptic Virtual Environments", Massachusetts Institute of Technology Master of Engineering Thesis, Sep. 1995, pp. 1-77.

MPB Technologies, Inc., "Freedom 3/6," 6 pages, 1996.

Nagel, "A Closer Look: Photoshop's New Paint Engine, p. 2 of 3," Mar. 7, 2002, http://www.creativemac.com/2002/03_mar/features/ps7dynamics1.htm (6 pgs.).

Nagel, "A Closer Look: Photoshop's New Paint Engine, p. 3 of 3" Mar. 7, 2002, http://www.creativemac.com/2002/03_mar/features/ps7dynamics1.htm (5 pgs.).

Nagel, "A Closer Look: Photoshop's New Paint Engine," Mar. 7, 2002, http://www.creativemac.com/2002/03_mar/features/ps7dynamics1.htm (5 pgs.).

Oboe, "Force-Reflecting Teleoperation Over the Internet: The JBIT Project," Proceedings of the IEEE, vol. 91, No. 3, pp. 449-462 (Mar. 2003).

Payne et al., "Distance Field Manipulation of Surface Models," IEEE Computer Graphics & Applications, pp. 65-71 (Jan. 1992).

Porter et al., "Compositing Digital Images," Computer Graphics, vol. 18, No. 3, Jul. 1984, pp. 253-259.

Rea, "Digital Photography and Electronic Imaging Glossary," Version 7.5.2 (Aug. 2000), 40 pgs.

"Revival of the Virtual Lathe," University of Michigan Virtual Reality Laboratory, http://www-vrl.umich.edu/sel_prj/lathe/, (Dec. 20, 2002).

Rogers, "An Introduction to NURBS," *Morgan Kaufmann Publishers*, (2000), pp. 1-4.

Safaric et al., "Control of Robot Arm with Virtual Environment via the Internet," Proceedings of the IEEE, vol. 91, No. 3, pp. 422-429 (Mar. 2003).

Salcudean et al., "On the Emulation of Stiff Walls and Static Friction with a Magnetically Levitated Input/Output Device," Dynamic Systems and Control: vol. 1, DSC-vol. 55-1, 1994, pp. 303-309.

Salisbury et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for Computing Machinery (ACM) and published by the ACM in Proceedings: 1995 Symposium on Interactive 3D Graphics, Monterey, California, Apr. 9-12, 1995, pp. 123-130.

SensAble Devices, Inc., "GHOST Brochure," 1995, Cambridge, MA (2 pgs).

SensAble Technologies, Inc., "Phantom Haptic Interface," 1996, Cambridge, MA (6 pgs).

Shimoga, "A Survey of Perceptual Feedback Issues in Dextrous Telemanipulation: Part I. Finger Force Feedback" published by IEEE Neural Networks Council in IEEE Virtual Reality Annual International Symposium, held Sep. 18-22, 1993 in Seattle, Washington, 1993, pp. 263-270.

Snow et al., "Compact Force-Reflecting Hand Controller," NASA Tech Brief, vol. 15, No. 4 from Jet Propulsion Laboratory Report NPO-17851-7348, Apr. 1991, pp. i, 1-3, 1a-11a, 14a, 15a.

Sorkine, et. al, "Bounded-distortion Piecewise Mesh Parameterization," Proceedings of the Conference on Visualization 2002, Boston, Massachusetts, pp. 355-362.

Sutter et al., "Response to Reflected-Force Feefback to Fingers in Teleoperations," Proc. of the NASA Conference On Space Telerobotics, pp. 65-74, NASA JPL, Jan. 1989.

Swarup, "Haptic Interaction with Deformable Objects Using Real-Time Dynamic Simulation", Massachusetts Institute of Technology, Sep. 1995, pp. 1-83.

Tan et al., "Virtual Environments for Internet-Based Robots—I: Modeling a Dynamic Environment," Proceedings of the IEEE, vol. 91, No. 3, pp. 383-388 (Mar. 2003).

Tan et al., "Virtual Environments for Internet-Based Robots—II: Path Planning," Proceedings of the IEEE, vol. 91, No. 3, pp. 389-395 (Mar. 2003).

Tanie et al., "Force Display Algorithms", 1993 IEEE International Conference on Robotics and Automation, May 2-7, 1993, Atlanta Georgia, USA, 1993, pp. 60-78.

Terzopoulos et al.; "Elastically Deformable Models"; Computer Graphics, vol. 21, No. 4, pp. 205-214 (Jul. 1987).

Wang et al., "Volume Sculpting", 1995 Symposium on Interactive 3D Graphics, Monterey, California, pp. 151-156.

Weisstein, "Conformal Mapping," *Wolfram Research*, printed Nov. 11, 2003, http://mathworld.wolfram.com/ConformalMapping.html, 7 pgs.

Yoshikawa et al., "Construction of Virtual World Using Dynamics Modules and Interaction Modules," Proceedings of the 1996 IEEE International Conference on Robotics and Automation (Minneapolis, MN), pp. 2358-2364 (Apr. 1996).

Zilles et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human Robot Interaction and Cooperative Robots, held Aug. 5-9, 1995 in Pittsburgh, Pennsylvania, 1995, pp. 146-151.

Zilles, "Haptic Rendering with the Toolhandle Haptic Interface," Massachusetts Institute of Technology Master of Science Thesis, May 1995, pp. 1-46.

Raindrop Geomagic, Inc. product description for "Geomagic Shape," Nov. 26, 2003 printout, http://www.geomagic.com/products/shape, 2 pgs.

Sensable Technologies, "Feature Overview," Nov. 25, 2003 printout, http://www.sensable.com/products/3ddesign/freeform/overview.asp, 5 pgs.

Sensable Technologies, "Feature Overview: Emboss with Wrapped Image," Nov. 25, 2003 printout, http://www.sensable.com/products/3ddesign/freeform/emboss_with_wrap.asp, 1 pg.

Sensable Technologies, "Free Form Concept System," Jan. 20, 2004 printout, http://www.sensable.com/products/3ddesign/concept/index.asp, 2 pgs.

Surfaces, *Avid Technology*, printed Nov. 6, 2003, http://www.iro.umontreal.ca/~roys/softimage/html/model/surfs.html, chapter 11, 22 pgs.

"Tensor Product Spline Surfaces," printed Nov. 17, 2003, http://www.ibiblio.org/e-notes/Splines/Inter.htm, 3 pgs.

"3-D Animation Workshop," printed Jul. 29, 2003, http://webreference.com/3d/, Lessons 39, 64-69, and 72; 79 pgs.

"Curves," *Avid Technology*, printed Nov. 6, 2003, http://www.iro.umontreal.ca/~roys/softimage/html/model/curves.html, chapter 10, 19 pgs.

"Fundamentals of NURBS Modeling," *Avid Technology*, printed Nov. 6, 2003, http://www.iro.umontreal.ca/~roys/softimage/html/model/nurbs_basics.html, chapter 9, 7 pgs.

"Points, Nets, Patches . . . " printed Nov. 17, 2003, http://www.people.nnov.ru/fractal/splines/nets.htm, 2 pgs.

"Touch-Enabled 3D Model Design," Department of Computer Science, University of North Carolina at Chapel Hill (Feb. 2002), 2 pgs.

Watkins, Adam. "The Maya 4.5 Handbook." Charles River Media, Inc. (c) 2003. ISBN 1-58450-234-7. pp. 332-336.

Gibson, 1995 6th Eurographics Workshop on Visualization in Scientific Computing, pp. 1-14.

Surfaces, Avid technology, Nov. 6, 2003 printout, Chap. 11, 22 pages, http://www.iro.wmontreal.ca/about.roys/softimage/html/model/surfs.html.

Gibson, Sarah F. Frisken, "Beyond Volume Rendering: Visualisation, Haptic Exploration, and Physical Modeling of Voxel-based Objects," Mitsibushi Electric Research Laboratories, Technical Report 95-04, Jan. 31, 1995.

US 5,903,456, 05/1999, Schena et al. (withdrawn)

\* cited by examiner

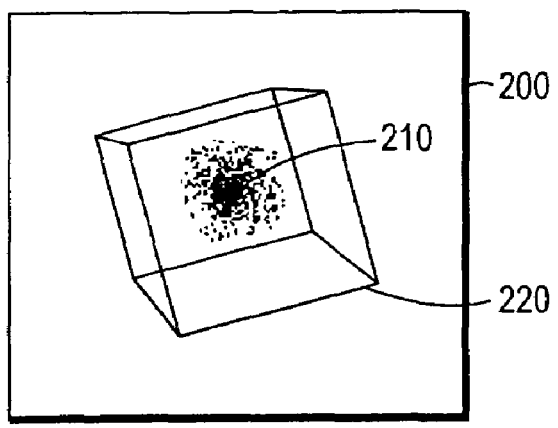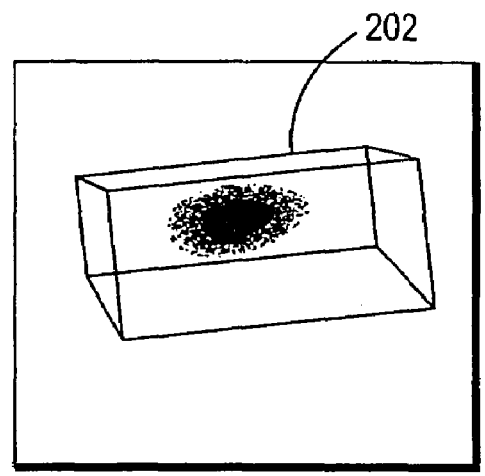
FIG. 2A
FIG. 2B

SYSTEMS AND METHODS FOR THREE-DIMENSIONAL MODELING

CROSS-REFERENCE TO RELATED APPLICATIONS

This application is a continuation of U.S. patent application Ser. No. 10/017,148, filed Dec. 14, 2001, issued as U.S. Pat. No. 6,958,752 on Oct. 25, 2005, which is incorporated by reference herein in its entirety and which claims the benefit of U.S. provisional patent application Ser. No. 60/260,278, filed Jan. 8, 2001, which application is incorporated herein in its entirety by reference.

FIELD OF INVENTION

This invention relates generally to methods and systems for modeling objects in three-dimensional space. More particularly, the invention relates to methods and systems for modeling a virtual object in a computer environment that undergoes transformations as a consequence of a user interacting with the virtual object.

BACKGROUND OF THE INVENTION

Software tools for three-dimensional modeling strongly couple the geometry representation with the allowable editing methods. For example, a voxel representation is limited to direct edits to the voxel grid, such as a Boolean addition, subtraction, or averaging of values. Likewise, a surface-triangles-based representation limits editing to modifications to various displacements of the triangle vertices. As a result, modeling capabilities which the end user can employ are limited to those tools that lend themselves to editing of the primary geometry representation. Editing performed on a primary geometry representation imposes limitations on the operations that can be performed, and certain operations can be so difficult to perform that they are virtually impossible without unacceptably excessive computational effort.

Some of the problems that exist in methods available in the prior art include the following negative features. In volumetric models, it is difficult if not impossible to make changes such as bending, stretching, and other gross modifications without loss of significant model details. Conversely, although surface-based methods more adequately support stretching, tugging, and other "rubber sheet" like operations, they lack the editing capabilities which volumetric representations provide, such as voxel-value-averaging and auto-mated handling of self-intersections and overlaps. An important negative consequence of these existing methods is that careful planning of model creation is required, with little or with no option to make appreciable changes once work is underway.

SUMMARY OF THE INVENTION

The methods and systems of the invention provide highly flexible editing of models in three-dimensional space. In one embodiment, the invention provides a method of modifying an object or a portion of an object by using an alternative subset representation for editing purposes. Using the results of editing this alternative subset representation, the original geometry is modified to substantially represent the edits made to the alternative representation. This method allows users to move transparently between editing in various representations while maintaining a cohesive base representation. For example, a portion of a voxel-based model can be transformed into a surface-triangles-based model. The surface-triangles-based model can be modified using triangle-based modification methods and the voxel-based model thereafter updated to reflect the changes. In another exemplary embodiment, a portion of a Non-Uniform Rational B-Spline (NURBS)-based model can be transformed into a voxel-based model. The voxel-based model can be modified using a voxel value averaging modification method and the NURBS-based model thereafter updated to reflect the changes. In a further exemplary embodiment, a portion of a voxel-based model can be transformed into a NURBS-based model. the NURBS-based model can be modified using control vertex modification methods and the voxel-based model thereafter updated to reflect the changes.

In one aspect, the invention relates to a method of modifying a virtual object stored within a computer. The method comprises the steps of representing a virtual object as a volumetric model; converting a subset of the volumetric model into an alternative representation; determining a response of the alternative representation to a stimulus; and modifying the volumetric representation so as to substantially represent the response of the alternative representation to the stimulus.

In some embodiments, determining a response of the alternative representation to a stimulus comprises determining a response of the alternative representation to a first stimulus and further determining a response of the alternative representation to a second succeeding stimulus. In some embodiments, modifying the volumetric representation comprises a change in shape of the volumetric representation. In some embodiments, modifying the volumetric representation comprises converting the response of the alternative representation to the stimulus into a response of the volumetric representation to the stimulus.

In some embodiments, the subset of the volumetric model is the entire volumetric model. In some embodiments, the subset of the volumetric model is a portion of the volumetric model. In some embodiments, the volumetric model comprises voxels. In some embodiments, the volumetric model comprises values spaced in a three-dimensional grid.

In some embodiments, the alternative representation comprises a surface representation. In some embodiments, the alternative representation comprises a set-of-triangles representation.

In some embodiments, the stimulus comprises a weighted displacement function defined on vertices of the set-of-triangles representation.

In some embodiments, the alternative representation comprises a selected one of a polygon set, a bezier surface, a b-spline surface, a procedural surface, and a NURBS representation. In some embodiments, the alternative representation comprises an alternative voxel representation.

In some embodiments, the stimulus is a stimulus from a user using a haptic interface. In some embodiments, the haptic interface is a force feedback interface. In some embodiments, the haptic interface has at least three degrees of force feedback.

In some embodiments, the method further comprises the step of displaying the virtual object on a computer display.

In some embodiments, the volumetric representation and the alternative representation comprise representations having different numbers of dimensions.

In some embodiments, the applied stimulus comprises at least one of a displacement function, a smoothing function, a warping function, a volumetric interference, an areal interference, a result of a simulation, a control point modification, a data re-fitting, and a force. In some embodiments, the applied stimulus is applied to the object in real time.

In some embodiments, the method further comprises the steps of transforming the alternative representation into a third representation; modifying the third representation in response to an applied stimulus; and transforming the modified third representation to a modified volumetric representation. In some embodiments, transforming the modified third representation to the modified volumetric representation comprises generating an intermediate modified representation.

In some embodiments, the stimulus comprises a user motion in the at least three-dimensional space.

In some embodiments, the method further comprises applying a feedback force to a user, the feedback force being generally consistent with a geometric shape of a modified virtual object.

In another aspect, the invention relates to a method of modifying a volumetric representation of an object. The method comprises the steps of transforming at least a portion of the volumetric representation into a polygonal set representation; modifying the polygonal set representation; and modifying the volumetric representation to substantially represent the modification made to the polygonal set representation.

In some embodiments, the modification comprises a selected one of a displacement function, a smoothing function, a warping function, a volumetric interference, an areal interference, a result of a simulation, a control point modification, a data re-fitting, and a force.

In yet another aspect, the invention features a method of modifying a volumetric representation of an object. The method comprises the steps of transforming at least a portion of the volumetric representation into a surface-based representation; modifying the surface-based representation; and modifying the volumetric representation to substantially represent the modification made to the surface based representation.

In another aspect, the invention relates to a system for modifying a virtual object stored within a computer. The system comprises a representation module that represents a virtual object as a volumetric model; a conversion module that converts a subset of the volumetric model into an alternative representation; an analytic module that determines a response of the alternative representation to a stimulus; and a modification module that modifies the volumetric representation so as to substantially represent the response of the alternative representation to the stimulus.

In some embodiments, the analytic module that determines a response of the alternative representation to a stimulus comprises an analytic module that determines a response of the alternative representation to a first stimulus and further determines a response of the alternative representation to a second succeeding stimulus. In some embodiments, the modification module that modifies the volumetric representation comprises a modification module that changes a shape of the volumetric representation. In some embodiments, the modification module that modifies the volumetric representation comprises a modification module that converts the response of the alternative representation to the stimulus into a response of the volumetric representation to the stimulus.

In some embodiments, the subset of the volumetric model is the entire volumetric model. In some embodiments, the subset of the volumetric model is a portion of the volumetric model. In some embodiments, the volumetric model comprises voxels. In some embodiments, the volumetric model comprises values spaced in a three-dimensional grid.

In some embodiments, the alternative representation comprises a surface representation. In some embodiments, the alternative representation comprises a set-of-triangles representation. In some embodiments, the stimulus comprises a weighted displacement function defined on vertices of the set-of-triangles representation. In some embodiments, the alternative representation comprises a selected one of a polygon set, a bezier surface, a b-spline surface, a procedural surface, and a NURBS representation. In some embodiments, the alternative representation comprises an alternative voxel representation.

In some embodiments, the stimulus is a stimulus from a user using a haptic interface. In some embodiments, the haptic interface is a force feedback interface. In some embodiments, the haptic interface has at least three degrees of force feedback.

In some embodiments, the system further comprises a display module that displays the virtual object on a computer display.

In some embodiments, the volumetric representation and the alternative representation comprise representations having different numbers of dimensions. In some embodiments, the applied stimulus comprises at least one of a displacement function, a smoothing function, a warping function, a volumetric interference, an areal interference, a result of a simulation, a control point modification, a data re-fitting, and a force. In some embodiments, the applied stimulus is applied to the object in real time.

In some embodiments, the system further comprises a second transformation module that transforms the alternative representation into a third representation; a third modification module that modifies the third representation in response to an applied stimulus; and a third transformation module that transforms the modified third representation to a modified volumetric representation.

In some embodiments, the third transformation module that transforms the modified third representation to the modified volumetric representation comprises a transformation module that generates an intermediate modified representation.

In some embodiments, at least two of the first, second and third modification modules are the same module. In some embodiments, at least two of the first, second and third transformation modules are the same module.

In some embodiments, the stimulus comprises a user motion in the at least three-dimensional space.

In some embodiments, the system further comprises a force feedback module that applies a feedback force to a user, the feedback force being generally consistent with a geometric shape of a modified virtual object.

In another aspect, the invention features a system of modifying a volumetric representation of an object. The system comprises a transformation module that transforms at least a portion of the volumetric representation into a polygonal set representation; a first modification module that modifies the polygonal set representation; and a second modification module that modifies the volumetric representation to substantially represent the modification made to the polygonal set representation.

In some embodiments, a selected one of the modification of the polygonal set representation and the modification of the volumetric representation comprises a selected one of a displacement function, a smoothing function, a warping function, a volumetric interference, an areal interference, a result of a simulation, a control point modification, a data re-fitting, and a force.

In yet another aspect, the invention relates to a system of modifying a volumetric representation of an object. The system comprises a transformation module that transforms at least a portion of the volumetric representation into a surface-based representation; a first modification module that modifies the surface-based representation; and a second modification module that modifies the volumetric representation to substantially represent the modification made to the surface based representation.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 2A-2B are images showing a spherical object represented in a three-dimensional volume before (FIG. 2A) and after (FIG. 2B) an illustrative deformation, according to principles of the invention;

DETAILED DESCRIPTION

Figure 1:
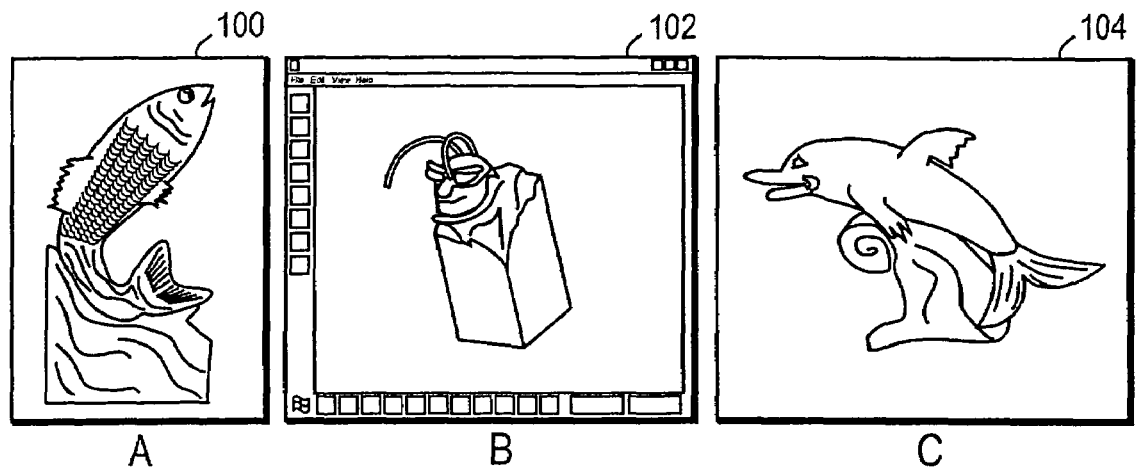
FIGS. 1A-1C are images illustrating various three-dimensional objects having surface details.

The invention is described with respect to an illustrative embodiment. However, it will be recognized that many alternative embodiments are possible. The illustrative embodiment involves editing a volumetric model by means of an intermediate surface representation. The methods of the invention allow more flexible interactive editing of such volumetric models by supporting a wider range of standard operations, without compromising the strengths of a volumetric representation. One exemplary method consists of extracting a portion of the canonical volumetric representation into a surface representation, iteratively modifying the surface representation via a combination of mathematical and user-derived inputs, then merging the modified surface portion back into the volumetric model.

The methods and systems of the invention are conveniently carried out on computer systems such as are described in U.S. Pat. No. 6,084,587, issued to Tarr et al. on Jul. 4, 2000, and U.S. Pat. No. 6,111,577, issued to Zilles et al. on Aug. 29, 2000, which patents are incorporated herein in their entirety by reference. An example of a computer that supports the systems and methods of the invention is a commercially available general purpose computer, such as a laptop or desktop personal computer, having a central processor unit, an input device (such as a keyboard, a mouse, and/or a touch screen), an output device (such as a display screen, a printer, and/or a speaker), haptic input and output devices, and memory (such as semiconductor memory, magnetic memory such as disks and/or tapes, optical memory, and CD-ROM and DVD recording and playback devices). In some embodiments, the computer operates alone, and in other embodiments, the computer communicates over a network. As those of skill in the computer arts will recognize, many different computers of many different types, operating a variety of operating systems, can support the systems and methods of the invention.

Embodiments of the invention other than the illustrative embodiments of the invention are possible. For example, the same basic process can be applied to using a volumetric representation as the base representation and a b-spline or bezier representation as the alternative subset representation. In a further illustrative embodiment, a triangle or quadrilateral based mesh is used as the base representation and a volumetric representation is employed as the alternative subset representation. Many other alternative embodiments can be enumerated.

In the description that follows, terms of art that are understood by practitioners of the mathematical and computer programming arts are frequently used. Some of these terms will be explained, rather than defined, in order to make more clear some of the discussion that follows.

A model representation can be understood as one or more internal data structures that express the basic physical structure of the object being modeled. All other model properties can be derived from the model representation, such as for example the response of the object to a specified mechanical force having known magnitude, direction, and duration that is applied to a known location of the object. A visual representation can be understood as one or more data structures used to support the provision of a visual display of the object being modeled, as well as an example of such a visual display itself. For example, in one embodiment, a visual representation can be the data necessary to render an image on a computer monitor or on a printer, and it can be the actual image so displayed or printed. A canonical representation can be understood as a standard model representation (e.g., a model conforming to a selected mathematical or logical description system) used in a particular modeling hardware and software system and associated method.

As an example, a canonical representation can be a description using voxels. An intermediate representation can be understood as a representation in one or more data structures used temporarily during model modification, and as a corresponding image that can be displayed by any conventional display method. A surface representation can be understood as a model representation consisting of an enumeration of boundary elements. In an exemplary three-dimensional system, a surface representation of an object can be understood as a two-dimensional representation of some portion of the object, such as a representation using a polygonal mesh, or a representation employing b-spline, bezier or other mathematical surface constructs. The surface represented can be an external surface or portion thereof, an internal surface or portion thereof, or a combination of both types of surfaces. A volumetric representation can be understood as a model representation based on an enumeration of volume elements, such as voxels, volumetric wavelets, and the like.

FIGS. 1A-1C are images 100, 102, 104 that illustrate various three-dimensional objects having surface details. FIG. 1A is an image 100 of a physical three-dimensional sculpture of a fish in a transparent medium, such as glass. FIG. 1B is an image 102 displayed on a computer display of a computer-readable file intended to represent a hypothetical creature as it is being carved from a block of a solid such as clay. FIG. 1C is an image 104 of a physical three-dimensional sculpture of a fish in a transparent medium, such as ice. These images are presented to provide the reader with a sense of the kind of models that can be created using prior art technology. However, one cannot readily deform either of the physical three-dimensional objects represented by images 100, 104 without modifying or destroying the detail contained in them. Further, using prior art modeling methods, it has not been possible to modify a computer-based model such as that depicted by image 102 without severely degrading the detail in the image. In particular, using methods of the prior art, the digital clay medium expressed visually as image 102 cannot be stretched, bent, warped, pulled, or otherwise modified in a manner not consistent with the canonical volumetric representation.

The invention disclosed herein preserves the properties of prior art methods, and adds new capabilities that provide the ability to stretch, bend, warp, pull or tug, and non-uniformly-scale a model such as that depicted in image 102.

FIGS. 2A-2B are images 200, 202 showing a spherical object 210 represented in a three-dimensional volume 220 before (FIG. 2A) and after (FIG. 2B) an illustrative deformation. FIGS. 2A-2B show an example of a process which can be termed "surface warping," in which the surface of a model is stretched without smoothing away details present on that surface. This provides the ability to make relatively large, global changes to models even at a stage of model development where high resolution features have been applied to the surface of the model. For example, the system permits a model of a head to be modified by puffing out the cheeks without losing facial details, or in a model of an automobile, to add some bulge to wheel wells without distorting the remainder of the vehicle. This is accomplished by converting three-dimensional elements of a volumetric model to a surface representation, for example in a polygonal surface representation, manipulating the model's polygonal surface representation, and performing a conversion of the modified surface representation back to a three-dimensional volumetric model, for example by re-rasterization to instantiate the changes in the volumetric model representation. The changes can optionally be visualized by providing a visual representation at any time, including in real time, as the modifications are performed by a user of the system.

Figure 3:
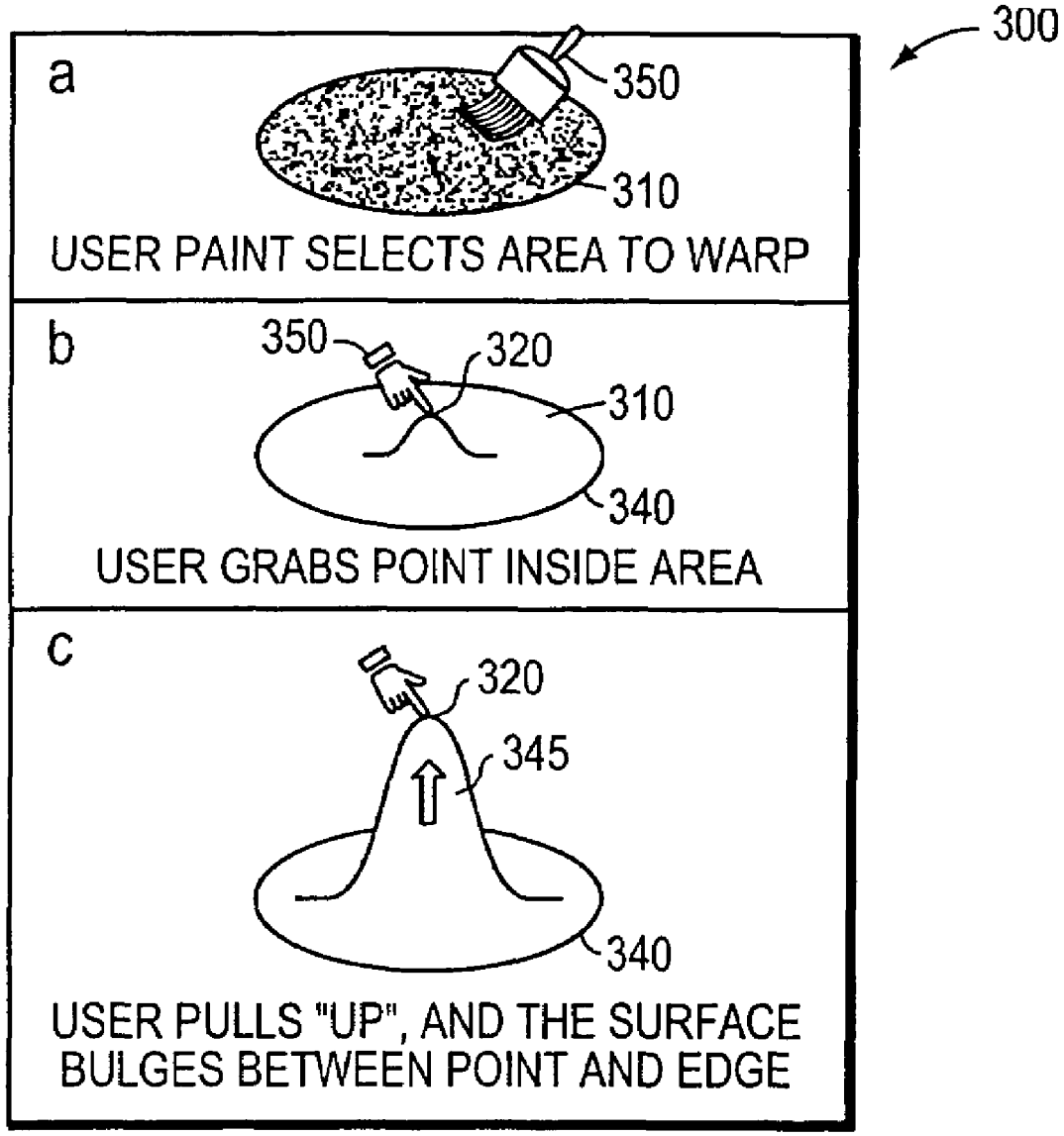
FIGS. 3A-3C are drawings that illustrate an embodiment of the invention relating to the selecting of an area to deform or warp (FIG. 3A), the selection of a location at which to apply the deformation or warp (FIG. 3B), and the application of a "pulling" force to the selected area at the selected location (FIG. 3C)

FIGS. 3A-3C are drawings 300 that illustrate an embodiment of the invention relating to the selecting of an area 310 to deform or warp (FIG. 3A), the selection of a location 320 at which to apply the deformation or warp (FIG. 3B), and the application of a "pulling" force 330 to the selected area 310 at the selected location 320 (FIG. 3C).

In FIG. 3A, a user of an embodiment of the system selects the surface of the model the user wishes to warp. In the illustrative embodiment, the user selects an area 310 using the paint-select mechanism of a graphical user interface, which selects a surface for either warping or smoothing. The selected area 310 has a periphery 340. In FIG. 3A, the area 310 that is selected is indicated by the user, who manipulates a cursor 350, such as the paintbrush shown in FIG. 3A. The manipulation can be accomplished using a computer pointing device such as a mouse, by using designated keys, such as the right arrow, the left arrow, the up arrow, and the down arrow keys of a computer keyboard, by use of a touch screen, or any other suitable method, including the use of a haptic interface device.

The user selects (or activates) the "Warp" computer command, whereupon the system creates an editable mesh corresponding to the surface selected by the user in FIG. 3A. The editable mesh can be generated using a polygonal, b-spline, or bezier representation, or the like. Optionally, in some embodiments, the selected area represented by the editable mesh can be identified to the user by being colored differently, or otherwise being visually distinct, so that the user can observe the results of his or her modifications while the user manipulates the modeled object.

In FIG. 3B, the user can "grab" a point on the selected area 310. In some embodiments, the user grabs the point by using a pointing device such as a mouse, and performing a "click and hold" operation with the mouse. Optionally, the location can be identified to the user by a cursor 350, such as the Hand Tool shown in FIG. 3B. The user can manipulate the selected area 310, which manipulation is performed mathematically upon the editable mesh. For example, the user can move or drag the selected area 310 around in three-dimensional space, with the periphery 340 of the area 310 fixed by application of a constraint at the coordinates that exist at the time the area 310 is selected.

As shown in FIG. 3C, the editable mesh "warps" to maintain a surface 345 that starts from the periphery 340 of the selected area 310 and continues through the point 320 being dragged about in three-dimensional space.

Figure 4:
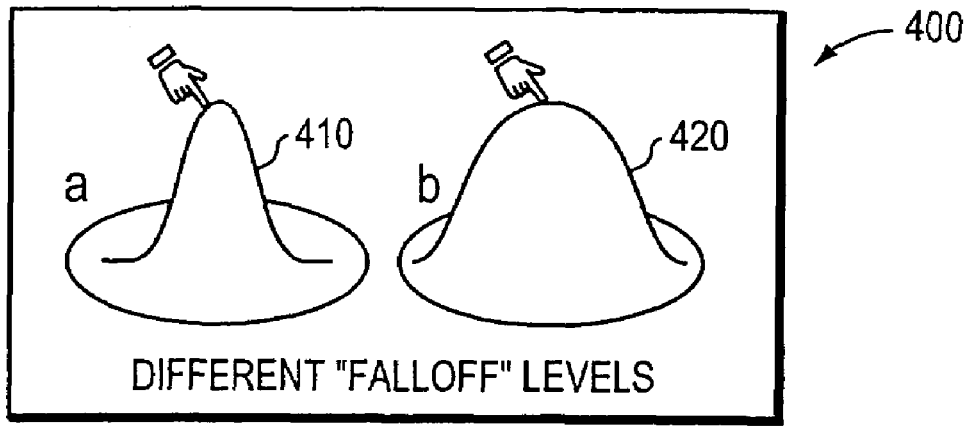
FIG. 4 is a drawing that illustrates different "falloff" levels in images "a" and "b," according to principles of the invention.

FIG. 4 is a drawing 400 that illustrates different "falloff" levels in images "a" 410 and "b" 420. The system may include a default value for the falloff parameter, which is invoked automatically by the system. The falloff parameter that is used to generate the surface between the selected point 320 and the periphery 340 of the selected area 310 is controllable by the user. For example, in the illustration, shape "a" 410 has a large rate of falloff, while shape "b" 420 has a smaller rate of falloff. In various embodiments, the rate of fall-off can be controlled by the user by entry of a value, by pressing a designated key of a keyboard to increase or decrease the rate of falloff, or by a similar interaction with the system. When the user is satisfied with the shape of the editable mesh, the user presses a key or otherwise selects a menu entry that indicates that the then current representation of the modified area 310 is acceptable, whereupon the modeling system transforms the intermediate representation used in modifying the model into the corresponding portion of the model representation. In some embodiments, the system re-rasterizes the intermediate model into the corresponding portion of the model representation.

Figure 5:
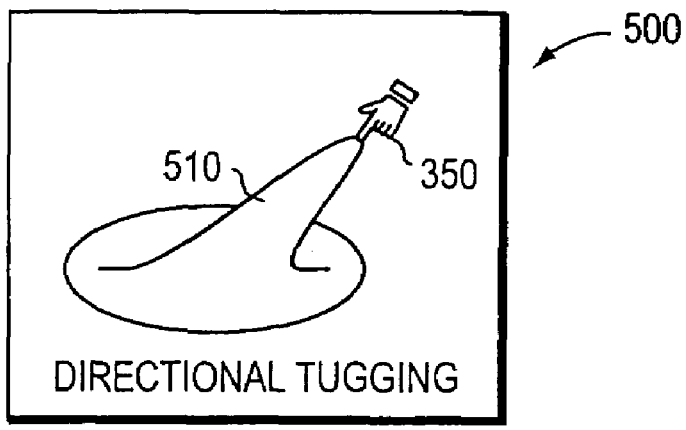
FIG. 5 is a drawing that illustrates the result of a directional tugging force applied to a selected area, according to principles of the invention.

FIG. 5 is a drawing 500 that illustrates the result of a directional tugging force applied to a selected area 310. In this illustrative example, the cursor 350, represented by the Hand Tool, is manipulated by the user in a direction other than along a normal to the planar surface defined by the periphery 340 of the selected area 310. The motion of the cursor 350 can be linear or curvilinear. As is apparent from FIG. 5, the resulting shape of the selected area 310 is a peaked volume 510, such as may be obtained by dipping one's finger into a mound of shaving cream and pulling upward and sideward. When the user indicates that the result is satisfactory, the system performs the operations of transforming the intermediate representation to a model representation, as discussed with regard to FIG. 4.

Figure 6:
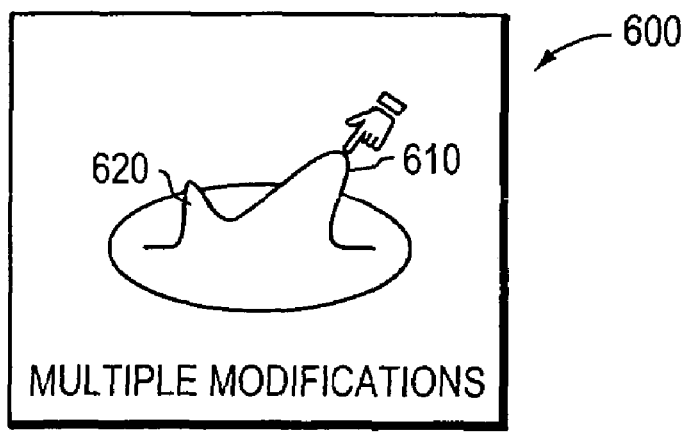
FIG. 6 is a drawing that illustrates the result of applying multiple modifications to a selected area, according to principles of the invention.

FIG. 6 is a drawing 600 that illustrates the result of applying multiple modifications to a selected area 310. The user can perform an operation such as is described with respect to FIG. 5, and can then perform a second operation, for example, by application of a pulling or tugging force at a new point 610. The resulting volume 620 can have characteristics that represent the first modification further modified by the second modification. Because the modification process can be performed iteratively, it is possible to apply as many discrete modifications as the user of the system elects to perform. When the user indicates that the result is satisfactory, the system performs the operations of transforming the intermediate representation to a model representation, as discussed with regard to FIG. 4. Alternatively, the intermediate representation is used to alter the model representation automatically upon each user edit.

Figure 7A:
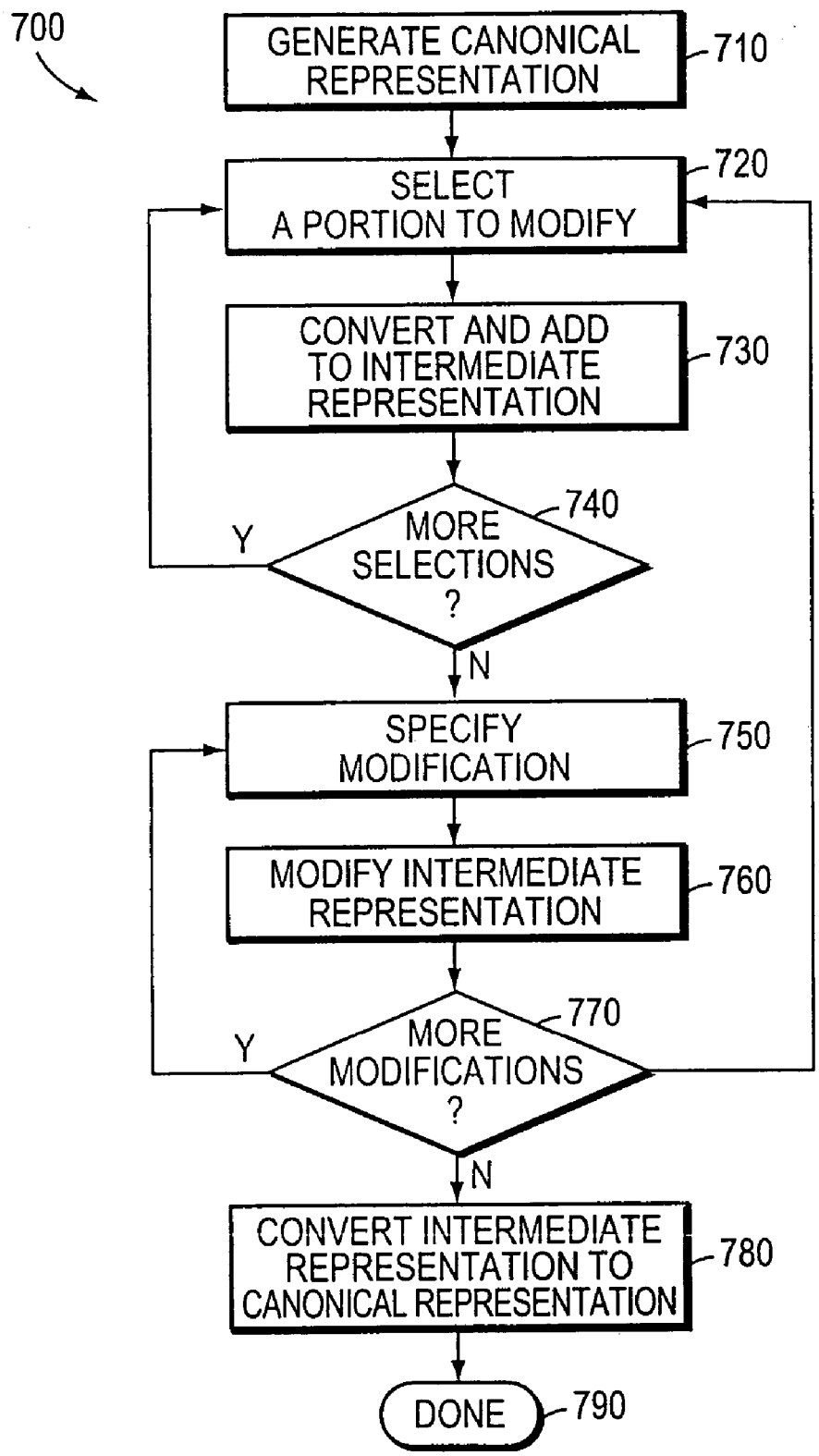
FIG. 7A is a flowchart showing schematically a sequence of operations during model editing according to one embodiment of the invention.

FIG. 7A is a flowchart 700 showing schematically a sequence of operations during model editing. In overview, an illustrative method for editing a model includes the steps of generating the canonical volumetric representation, and optionally, generating a visual representation corresponding to the canonical volumetric representation. The method includes specifying at least a portion of the model to be modified. The specification can be performed manually or by automatic methods. The method includes converting the selected portion of the volumetric model into a surface representation. The method can optionally include updating the visual representation accordingly. The method includes modifying the surface representation using a combination of interactively specified user inputs and mathematical manipulation according to algorithmic processes encoded into the system. The method includes transforming the modified surface representation and incorporating the modified representation into the canonical volumetric representation. The method optionally includes updating the visual representation and optionally displaying the visual representation for the user. Each of these illustrative steps will be explained in further detail below.

The step 710 of generating the canonical volumetric representation involves converting information about an object into a mathematical representation in a form expected by the system, which for the purposes of this discussion is the standard form. At any step in the process expressed by flow diagram 700, the system can optionally compute a visual representation of the object that is being modeled, and can optionally display a corresponding visual representation to the user. In some embodiments, the computation of the visual representation is performed automatically by the system. In some embodiments, the display of the visual representation is performed automatically by the system. In some embodiments, the computation and the display are performed in response to a command from a user.

The original volumetric representation can come from a variety of sources. In some embodiments, the volumetric representation comes from tomographic data (three-dimensional scans) or surface scans that have been converted into volumetric form. In some embodiments, the volumetric representation is the output of a prior sequence of manual or automatic volumetric editing steps. Regardless of the process, in some embodiments, the representation is a volumetric representation (e.g., a voxel grid) that enumerates the contents of the object to be modeled at every point in three-dimensional space. A visual representation is derived from the volumetric representation to allow the model to be viewed. The visual representation includes one or more data structures to support a direct rendering method such as ray casting. In some embodiments, the visual representation includes a secondary non-volumetric derived representation, such as an isosurface.

The step 720 of selecting or specifying of a portion of the model to be modified can be performed under manual control by the user or alternatively can be performed by automatic specification by the system. A portion of the volumetric representation of the model is selected for modification. In different embodiments, the selection step 720 can include, but is not limited to, specification of a sub-volume using an interactively positioned tool with a region of influence. In one embodiment, the interactively positioned tool is a user controlled stylus, and the region of influence is determined by a user-controllable radius. In one embodiment, the position specification of a portion of the model to be modified is performed in conjunction with the projection of a user-positionable two-dimensional image onto the model. In one embodiment, the specification of a portion of the model to be modified is accomplished by drawing a closed curve on the region to be modified, for example using a pointing device such as a mouse or a stylus. In some embodiments, the interactively positionable tool is a haptic interface device.

The step 730 of converting the selected portion of the volumetric model into an intermediate surface representation is performed automatically by the system, using algorithmic mathematical manipulations. Upon specification of the portion of the model to be modified, the system converts the specified portion into the intermediate representation. In some embodiments, the selected portion of an isosurface is converted into a freely deformable polygonal mesh. In another embodiment, the selected portion of an isosurface is extracted into one or more NURBS patches.

The step 730 optionally includes updating the visual representation at the same time, to allow visual display during modification. For example, if modifications will be displayed by deforming an extracted polygonal mesh, the corresponding portion of the original isosurface typically should not be displayed at the same time, in order to avoid confusing the user.

The step 730 further includes updating the intermediate surface representation of the selected portion of the model with a second or later selected portion. The optional visual representation is updated accordingly. The step 740 includes obtaining from the user an indication of whether more selections of portions of the model for modification are contemplated, and if so, repeating steps 720 and 730 as many times as may be required. When the user indicates that no additional portions of the model are intended to be modified, the system proceeds to making the modifications, at step 750.

The step 750 of specifying the modification to be performed on the intermediate surface representation is accomplished by obtaining specifications from the user. In some embodiments, the specified modifications include pulling a portion of the surface from its original location toward an interactively specified new location in three-dimensional space, raising or lowering the surface representation, or raising or lowering the portion of the surface lying within a previously specified closed curve on the model by a user-specified distance. In one embodiment, the user can use a two-dimensional image to specify an amount of displacement. As previously indicated, constraints can be applied to the specified modification to limit the amount of deformation that takes place.

The step 760 of modifying the intermediate representation can be performed using a combination of mathematical and interactively specified inputs. The user can interactively specify further modifications, as indicated at step 770. The user can additionally return to step 720 to select a new portion of the model to modify, or the user may continue to the next step 780.

At step 780, the system incorporates the modified surface into the canonical volumetric representation and optionally updates the visual representation. After the selected modifications are complete, the modified portions of the surface representation are reincorporated into the canonical volume representation. In one embodiment, the canonical representation comprises voxels and an intermediate representation comprises a polygonal mesh. In order to convert the intermediate representation into the canonical representation, the displaced surface is analyzed for surface crossings, which are locations where adjacent voxels lie on opposite sides of the displaced surface. Voxels can be classified as in or out based on the number of such crossings they experience, and may be assigned more precise non-binary values by incorporating information about the distance from each voxel to the crossings that influence it.

Figure 7B:
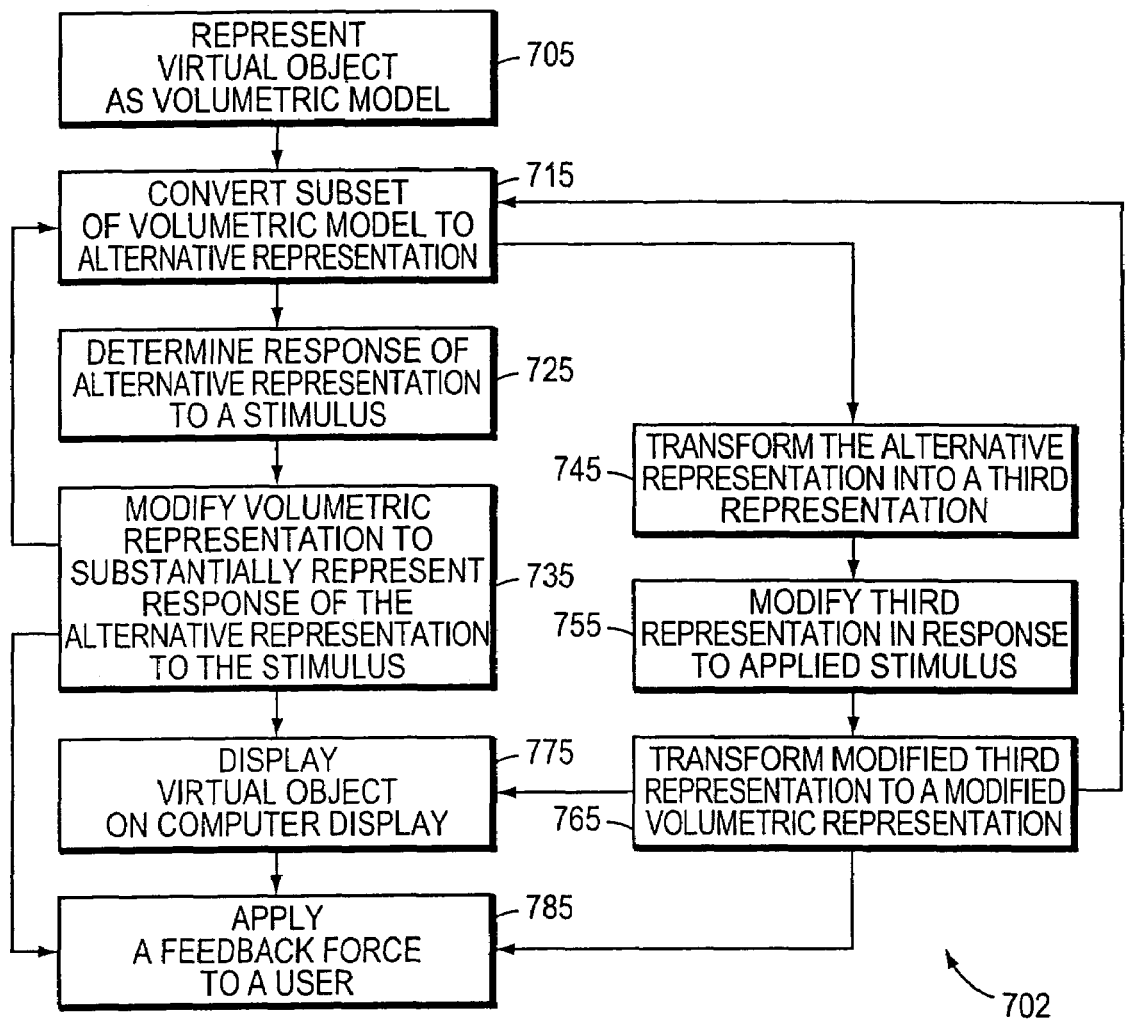
FIG. 7B is a flowchart showing schematically the organization of a system for three-dimensional modeling that comprises computer modules, according to one embodiment of the invention.

FIG. 7B is a flowchart 702 showing schematically the organization of a system for three-dimensional modeling that comprises computer modules. In overview, an illustrative system for three-dimensional modeling includes modules that control the steps of a computer modeling process. In this system, a virtual object is stored within a computer, for example in conjunction with a haptic interface or virtual reality environment. A representation module 705 controls how the computer represents a virtual object as a volumetric model. A conversion module 715 converts some (a subset) or all of the volumetric model into an alternative model. In order to modify the virtual object, the virtual object is subjected to at least one stimulus. The stimulus can be applied by a user. As is understood by those of skill in the mathematical arts, a subset can include, as examples, the entire set, a portion of the entire set, or none of the entire set.

An analytical module 725 determines a response of the alternative representation to at least one stimulus. Analytical module 725 modifies the surface representation using a combination of interactively specified user inputs and mathematical manipulation according to algorithmic processes encoded into the system. A modification module 735 modifies the volumetric representation so as to represent the response of the alternative representation of the virtual object to the stimulus. Modification module 735 controls transformation of the modified surface representation and incorporation of the modified representation into the volumetric representation. In alternative embodiments, the system includes a second transformation module 745 that controls the transformation of the alternative representation into a third representation, The system can also include another modification module 755 that controls the modification of the third representation. The system can optionally also include a transformation module 765 that transforms the modified third representation to a modified volumetric representation. The system optionally includes modules that update the visual representation and optionally display the visual representation for the user, such as display module 775. Optionally, the system comprises a display module 775 that displays the modified alternative representation and/or the modified volumetric representation to a user from time to time. Optionally, the system comprises a haptic force feedback interface that applies a haptic feedback force to a user in conjunction with a force application module 785. The system allows the user or a computer to specify at least a portion of the model to be modified. The specification can be performed manually or by automatic methods. Each of these illustrative modules, and the steps each module controls, are explained in further detail below.

The computer modules control the conversion of the selected portion of the volumetric model into an alternative representation, such as a surface representation, a set-of triangles representation, a polygon set, a bezier surface, a b-spline surface, a procedural surface, and a NURBS representation. A procedural surface is one which is expressed or defined by a mathematical process or procedure. For example, a procedural surface could be defined as the surface two units of measure above the floor of a room and two units of measure above any objects resting on that floor. One procedural surface results if a basketball were left on the floor, while a different procedural surface results if a rollerskate were left on the floor. Either procedural surface changes if the object on the floor moves.

In the illustrative embodiment, the representation module 705 that controls or performs the process of representing the virtual object as a multidimensional (for example, volumetric) model converts information about an object into a mathematical representation in a form expected by the system, which for the purposes of this discussion is the standard form. From time to time, the system can optionally compute a visual representation of the object that is being modeled, and can optionally display a corresponding visual representation to the user. In some embodiments, the computation of the visual representation is performed automatically by the system. In some embodiments, the display of the visual representation is performed automatically by the system. In some embodiments, the computation and the display are performed in response to a command from a user. The illustrative comments made above about volumetric representations apply here as well in the case of a volumetric model.

In the illustrative embodiment, the conversion module 715 controls the selection or specification of a portion of the model to be modified. The selection or specification can be performed under manual control by the user or alternatively can be performed by automatic specification by the system. In one embodiment, a portion of the volumetric representation of the model is selected for modification. In different embodiments, the selection can include, but is not limited to, specification of a sub-volume using an interactively positioned tool with a region of influence. In one embodiment, the interactively positioned tool is a user controlled stylus, and the region of influence is determined by a user-controllable radius. In one embodiment, the position specification of a portion of the model to be modified is performed in conjunction with the projection of a user-positionable two-dimensional image onto the model. In one embodiment, the specification of a portion of the model to be modified is accomplished by drawing a closed curve on the region to be modified, for example using a pointing device such as a mouse or a stylus. In one embodiment, the user employs a haptic interface device to designate the portion of the model to be modified, In the illustrative embodiment, the conversion module 715 converts the selected portion of the multi-dimensional model, such as a volumetric model, into an intermediate representation, such as a surface representation. The conversion is performed automatically by the system, using algorithmic mathematical manipulations. Upon specification of the portion of the model to be modified, the system converts the specified portion into the intermediate representation. In some embodiments, the selected portion of an isosurface is converted into a freely deformable polygonal mesh. In another embodiment, the selected portion of an isosurface is extracted into one or more NURBS patches.

In the illustrative embodiment, the conversion module 715 optionally includes the ability to update the visual representation at the same time, to allow visual display 775 during modification. For example, in one embodiment, if modifications will be displayed by deforming an extracted polygonal mesh, the corresponding portion of the original isosurface typically should not be displayed at the same time, in order to avoid confusing the user. As is understood in the software arts, the visual updating can be performed by invoking a module such as the display module 775 as a subroutine.

In the illustrative embodiment, the conversion module 715 further includes updating the intermediate surface representation of the selected portion of the model with a second or later selected portion. The optional visual representation is updated accordingly.

In the illustrative embodiment, the analytical module 725 specifies the modification to be performed on the intermediate surface representation. In some embodiments, the specified modifications include pulling a portion of the surface from its original location toward an interactively specified new location in three-dimensional space, raising or lowering the surface representation, or raising or lowering the portion of the surface lying within a previously specified closed curve on the model by a user-specified distance. In one embodiment, the user can use a two-dimensional image to specify an amount of displacement.

The modification of the intermediate representation can be performed using a combination of mathematical and interactively specified inputs. The modification can be limited by application of one or more constraints that limit the magnitude of a displacement of the model, The user can interactively specify further modifications. The user can additionally select a new portion of the model to modify.

In the illustrative embodiment, the modification module 735 incorporates the modified surface into the volumetric representation. Optionally, display module 775 updates the visual representation. The modification module 735 can call the display module 775 as a subroutine. Alternatively, the display module 775 is activated by a command from the user.

In the illustrative embodiment, after the selected modifications are complete, the modified portions of the surface representation are reincorporated into the volumetric representation. In one embodiment, the volumetric representation comprises voxels and an intermediate representation comprises a polygonal mesh. In such an embodiment, in order to convert the intermediate representation into the volumetric representation, the displaced surface is analyzed for surface crossings, which are locations where adjacent voxels lie on opposite sides of the displaced surface. Voxels can be classified as in or out based on the number of such crossings they experience, and may be assigned more precise non-binary values by incorporating information about the distance from each voxel to the crossings that influence it. In general, for representations that involve surfaces, one can define a first side of a surface and a second side of a surface, or "inside" a surface and "outside" a surface. For objects that are volumes, one can define modifications that preserve the volume while changing a shape of the volume. Alternatively, one can define modifications in which the volume increases, or modifications in which the volume decreases.

As will be appreciated by those of skill in the software arts, the various modules can often be used repeatedly in any one session. As indicated in FIG. 7B, the system can allow a user to complete a modification of a representation, and can then return to the conversion module 715 in order to select a further subset or portion of the model for further modification. As will be appreciated by those of skill in the software arts, a module that embodies a particular set of instructions that perform a specific logical operation or group of operations often can be duplicated in hard-wired circuitry, or in a combination of software and hard-wired circuitry, in a manner which is completely transparent to a user. In some embodiments, one or more modules can be provided in hard-wired form or can be provided as a pre-programmed chip in order to assure that a particular instruction or set of instructions is performed in the same manner, independent of user input or user manipulation. As will be appreciated by those of skill in the software arts, it is often possible to write more than one computer program module to perform the same one task when operating, or to write a module in any one of several programming languages such that the module, when operating, performs substantially the same steps, or performs substantially equivalent steps, to attain a particular result. All such variants are contemplated herein.

Figure 8:
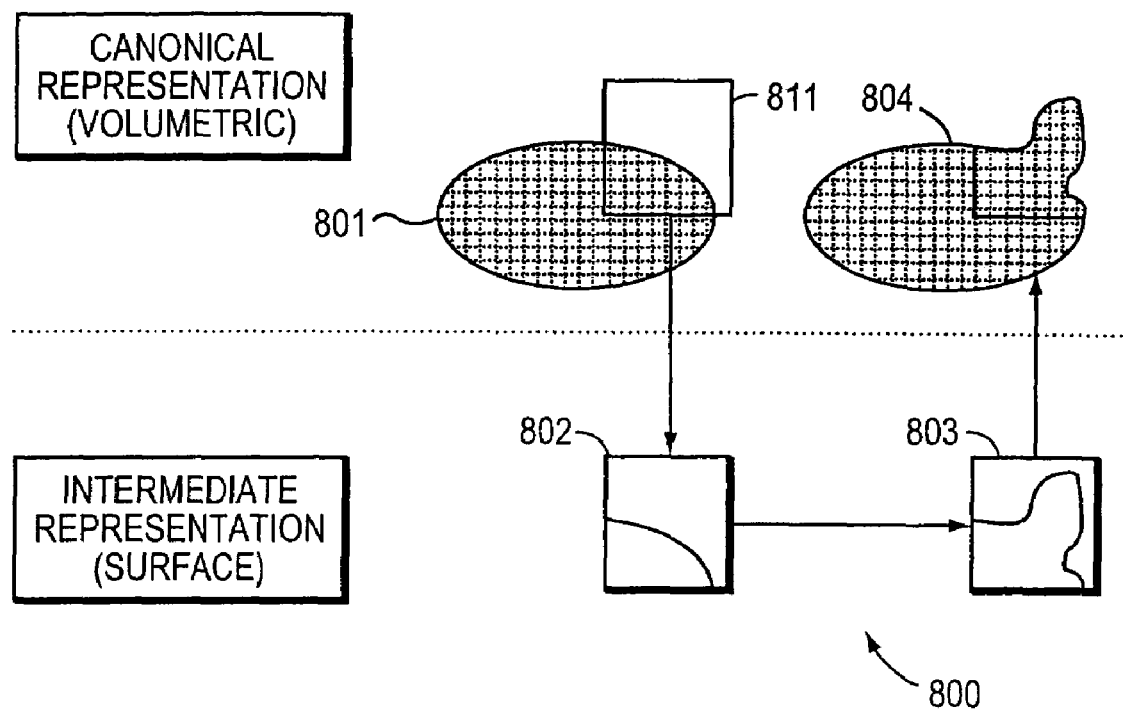
FIG. 8 is a schematic diagram showing illustrative transformations of a modified portion of a model from canonical representation to intermediate representation and back, with editing done on the intermediate representation, according to principles of the invention.

FIG. 8 is a schematic diagram 800 showing illustrative transformations of a modified portion of a model from canonical to intermediate representation and back, with editing done in the intermediate representation. In FIG. 8, a canonical volumetric representation 801 of an object is provided. A bounding box 811 indicates a region of the representation 801 has been selected for modification. The region in the bounding box 811 is expressed in an intermediate surface representation 802. In this illustrative example, the user specifies one or more modifications of the object that cause the transformation of representation 802 to the modified intermediate surface representation 803. When the user is satisfied with the transformations, the system converts the modified intermediate surface representation 803 into the modified volumetric representation 804. The system optionally computes and optionally displays visual representations corresponding to representations 801, 802, 803, and 804 for the convenience of the user.

Figure 9:
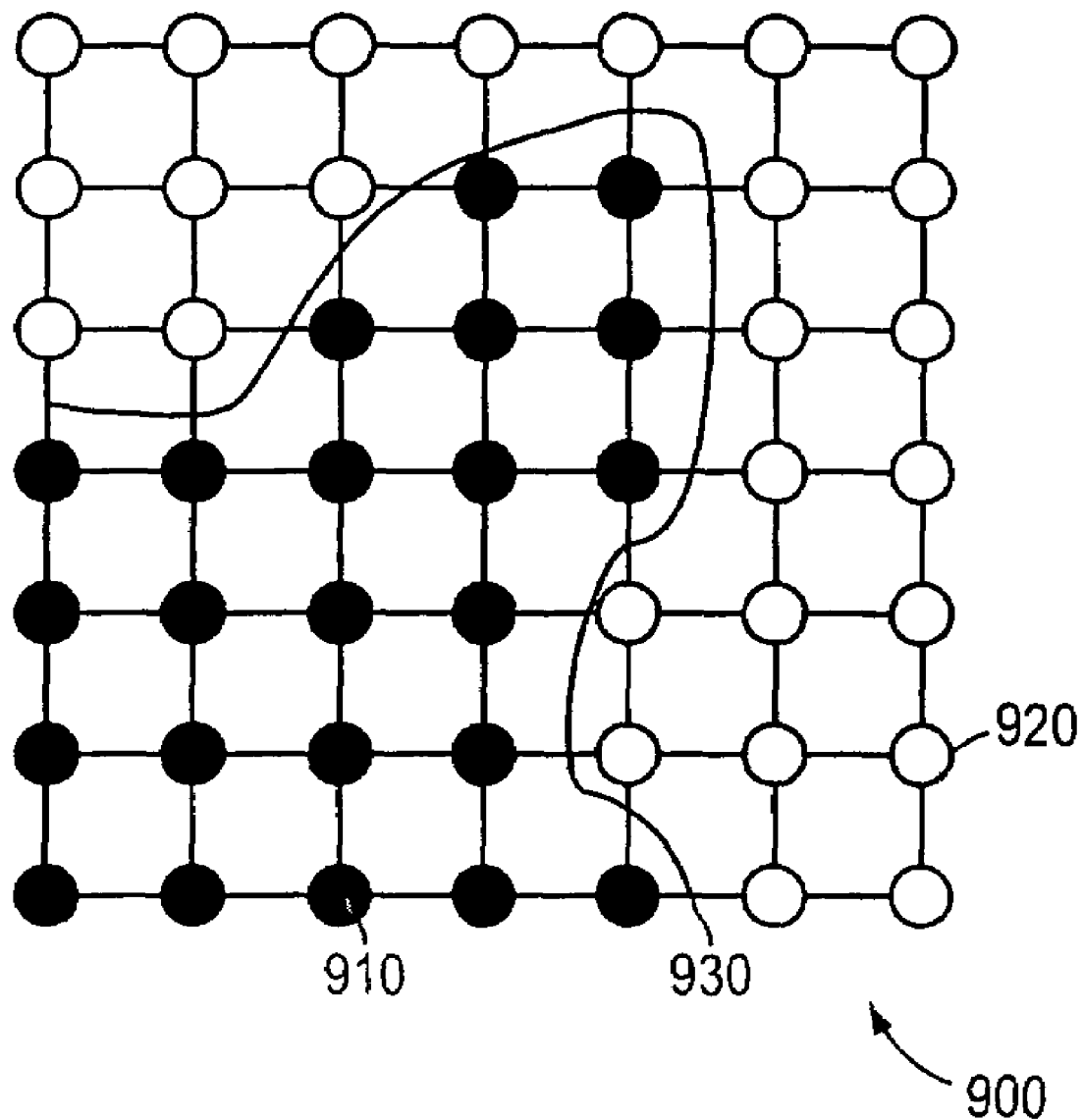
FIG. 9 is a diagram showing an embodiment of an illustrative rasterization process based on surface crossings for conversion of a model from surface representation to volumetric representation according to principles of the invention.

FIG. 9 is a diagram 900 showing an embodiment of an illustrative rasterization process based on surface crossings for conversion of a model from a surface representation to a volumetric representation. FIG. 9 depicts a cross section through a surface representation superimposed on a grid of voxels defined on a square lattice. The curvilinear line 930 denotes the locus of points that represent the surface representation. After application of a transformation, some of the points 910, shown in filled circles, fall to one side of the surface. Other points 920 lie on the other side of the surface. The system can then compute the required three-dimensional values for representing the appropriate volume in the three-dimensional canonical representation, for modification of a modeled object.

Figure 10:
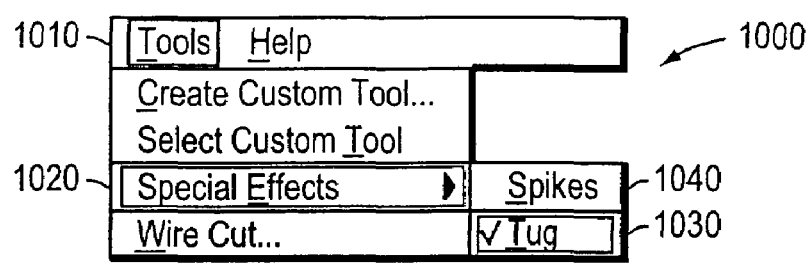
FIG. 10 is an image of an embodiment of a menu in a computer user interface that provides access to modeling features according to systems and methods of the invention.

FIG. 10 is an image 1000 of an embodiment of a menu in a computer user interface that provides access to modeling features. In the illustrative system, a computer user interface having a "look and feel" similar to one or more of the well-known Windows™ (Windows™ is a trademark of the Microsoft Corporation, Redmond, Wash., USA) applications is depicted. In other embodiments, user interfaces of different types, having a different "look and feel," are possible, as will be appreciated by those of ordinary skill in the computer programming arts. The illustrative interface has a menu item denoted by the term "Tools" 1010. A subcategory of tools is denoted by "Special Effects" 1020. Individual special effects are indicated by the menu items "Tug" 1030, which will be described in greater detail below, and by "Spikes" 1040. As those of ordinary skill in the computer arts understand, the user can invoke an individual special effect by successively activating the sequence of items Tools 1010, Special Effects 1020, Tug 1030 using a pointing device such as a mouse, a touch pad, a touch screen, or a light pen, or by issuing the sequence of keyboard commands Control-T (<CTRL>-T), Control-E, and Control-T, based on the underscored letter of the corresponding command. When a user has issued the appropriate commands, the Tug functionality of the system is activated, and the user is presented with an instance of illustrative FIG. 11.

"Tug" is an effect that is accessed through the Tools->Special Effects->Tug menu as described above. In one embodiment, this brings the system into a mode where a cursor 350 normally represented by an icon having the shape of a hand is replaced with a transparent clay-colored sphere with a red center point. The cursor display indicates to the user that the "Tug" functionality is active, and can show the user the effects that commands issued by the user will have on the object that is being modeled.

The sphere indicates the region of the model that will be modified using a falloff function centered at the red point. The default falloff function may be determined empirically. In one embodiment, the curve that is implemented is essentially a bell curve. It is chosen because it provides an esthetically pleasing taper to the edge of a selected region and multiple tug operations can be performed with good resolution in the valley that results between successive tug operations, as indicated previously in conjunction with FIG. 6.

In operation, the user places the sphere on the model, thereby selecting a region to modify, and then holds the button on a haptic feedback system stylus to activate the tug operation, and modifies the model by applying tugs to the clay. The system provides a spring force to help control the placement of the sphere. The surface model updates in real-time. When the stylus button is released, the modified polygons stay in their then-current positions. The visual representation is updated to provide visual feedback to the user in real time. The user can continue to modify the surface by repeating the sequence of commands.

Figure 11:
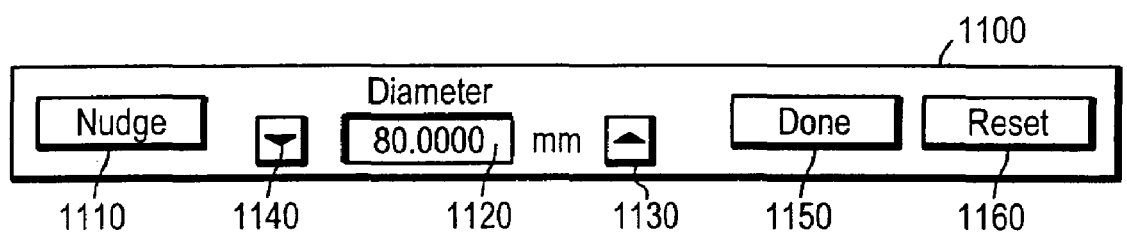
FIG. 11 is an image of an embodiment of a control panel that allows a user to control the operation of modeling features according to systems and methods of the invention.

FIG. 11 is an image 1100 of an embodiment of a control panel that allows a user to control the operation of modeling features of the Tug functionality. Image 1100 is a software control called a dynabar. The dynabar 1100 includes a button 1110 labeled "Nudge," a text box 1120 in which the user can enter numerical values, an increment arrow 1130 and a decrement arrow 1140 that can be used to modify the value in text box 1120, a button 1150 labeled "Done" that permits the user to accept the effects of one or more modifications, and a button 1160 labeled "Reset" that cancels all modifications since the latest action selected from the group consisting of invoking the tug functionality and activating the "Done" button 1150.

When the user issues the "Done" command, the model is re-rasterized to incorporate any changes that have been made. If no changes have been made or the model has been reset or all changes have been undone, the button is unavailable, e.g., it is displayed in a "grayed-out" visual representation. Activation of the Done button 1150 does not cause the Tug functionality to terminate.

The Reset button 1160 undoes all changes that have been made since entering the tug environment or since the last "Done" command. It is unavailable when the "Done" command is unavailable.

The diameter of the sphere can be changed through a text field within a range of values having the current dimensional units, through use of the increment and decrement arrow buttons 1130, 1140, or continuous tool resize using a selected keyboard key, such as the "[" key. The Reset button 1160 undoes all of the changes to the surface model. The Nudge button 1110 attenuates the motion of the surface model to aid in making precise changes. The operation of the Nudge button 1110 is more fully described in the U.S. provisional patent application Ser. No. 60/255,530, filed Dec. 14, 2000, entitled "Systems and Methods for Three-Dimensional Modelling." Activation of the Done button 1150 incorporates the changes into the model.

Figure 12:
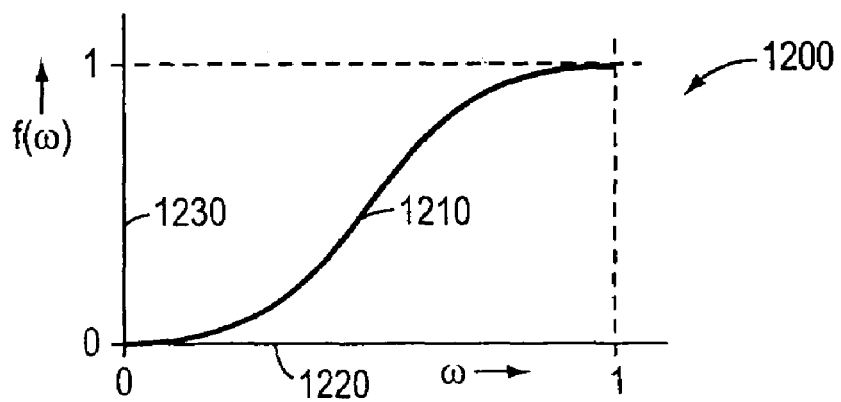
FIG. 12 is a graph that illustrates an embodiment of a single valued-distribution function $f(\omega)$ that maps the interval $[0,1]$ as a 1-to-1 mapping onto the interval $[0,1]$, according to principles of the invention.

FIG. 12 is a graph 1200 that illustrates an embodiment of a single valued-distribution function $f(\omega)$ 1210 that maps the interval [0,1] along the horizontal axis 1220 as a 1-to-1 mapping onto the interval [0,1] along the vertical axis 1230. A single-valued function is one that has a single dependent value y for each discrete independent value x. In one embodiment, the function can be a sigmoidal function as shown in FIG. 12.

Figure 13A:
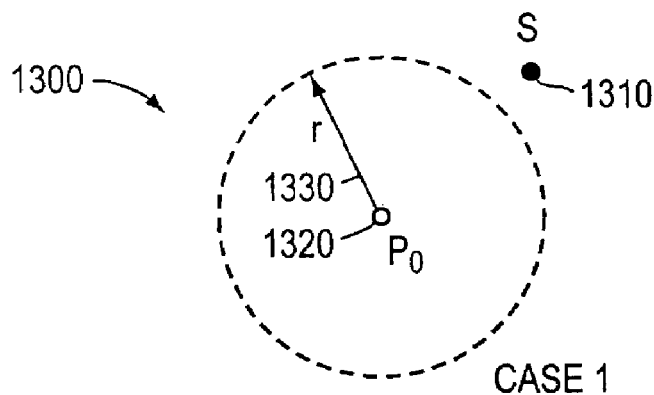
FIGS. 13A-13B are graphs that illustrate various relationships between a source point S and a point $P_0$ that the point S can influence, according to principles of the invention.
Figure 13B:
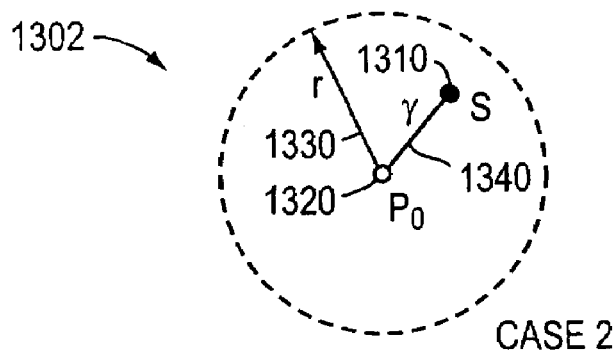

FIGS. 13A-13B are graphs 1300, 1302 that illustrate various relationships between a source point S 1310 and a point $P_0$ 1320 that the point S can influence.

In one embodiment, the system can perform smoothing without losing details that exist in a model. The smoothing operation produces locally fair surfaces. This new operation also can be used to repair and/or clean up input files for editing.

The following is a high level description of the algorithm. Following this is one approach to implementation and some concluding remarks. The algorithm uses as inputs a closed boundary on the isosurface of the model, a complexity factor that establishes the baseline for the desired result of smoothing, a smoothing factor in [0,1] that establishes the amount of desired smoothing for the target patch calculated from the initial patch, and a fall-off function that allows the smoothing effect to gradually taper to zero at the initial patch boundary.

In some embodiments, the closed boundary on the isosurface of the model is a four-sided patch boundary. In alternative embodiments, the closed boundary is an arbitrarily shaped region. The isosurface triangle data within the boundary is referred to as the initial patch.

In some embodiments, the complexity factor that establishes the baseline for the desired result of smoothing is in [0,1] where 0 indicates the initial patch contains little surface detail to be modeled and 1 indicates the initial patch has a lot of surface detail to be modeled.

In some embodiments, the smoothing factor is in [0,1] that establishes the amount of desired smoothing for the target patch calculated from the initial patch. A factor of 0 indicates no smoothing and a value of 1 indicates maximal smoothing.

In some embodiments, the fall-off function that allows the smoothing effect to gradually taper at the initial patch boundary is described as a factor in [0,1] where 0 indicates no fall-off and 1 indicates a maximum default fall-off. In other embodiments, this fall-off function is an arbitrarily shaped, force-based function applied to the isosurface.

The command issued by a user includes defining the boundary and interactively and iteratively adjusting the complexity factor, the smoothing factor, and the fall-off function until the resulting output is satisfactory. In one embodiment, the boundary is defined by interactive tracing on the surface.

In some embodiments, the complexity factor is adjusted much less frequently than the smoothing factor and fall-off function. In one embodiment, these controls are simple sliders. After each change, the user is shown a simulation of the result that will be achieved if the operation is executed. In alternative embodiments, the command provides "before-and-after" control for assessing the visual change.

In one embodiment, after the boundary is established and a complexity factor is given, or each time the complexity factor changes, the algorithm models the initial patch with two mathematical descriptions, including a baseline surface model and a displacement map in the u-v unit square.

The baseline surface model is a mathematical interpolation of the triangle vertices. A known approach to such surface fitting problems is the use of least-squares fits to NURBS surfaces. The baseline surface is then a parametric definition $S(u,v)$ where $u,v \in [0,1]$. The number of control points defining S is established by the complexity factor. In order to achieve a good surface fit, a set of well-behaved isocurves is generated along the initial patch, and the isocurve intersections become the targets of the interpolation. This set of intersections is referred to as the baseline grid.

In one embodiment, the displacement map in the u-v unit square tracks the "error" between the initial patch and the baseline surface model. This displacement map is referred to as the three-dimensional vector valued function $D(u,v)$.

Within computational round-off error, each point of the baseline grid should equal $S(u,v)+D(u,v)$ for the $(u,v)$ coordinates that correspond to that grid point. That is, if $O(u,v)$ represents the original triangle data at the baseline grid values, we then have:

$$O(u_i,v_j) \approx S(u_i,v_j)+D(u_i,v_j)$$

at the baseline grid points $(u_i, v_j)$.

In one embodiment, the original patch is modeled as a smooth and fair (with moderate to low complexity factor) surface plus the bumps that occur on it.

The fall-off function is a scalar-valued function $f(u,v) \in [0,1]$. In one embodiment, the user provides a 1-dimensional input to generate f. A user value of 0 (no fall-off) establishes $f(u,v)=1$ for all $u,v$. A user value of 1 (maximum default fall-off) establishes $f(u,v)=1$ for all $u,v$ within the "center" of the u-v unit square and functional values feathering to 0 at the edges of the square. This feathering is a known two-dimensional imaging technique and is facilitated by the two-dimensional nature of the u-v parametric space.

Referring to the smoothing factor as s, we calculate a target surface $(T(u,v))$ as:

$$T(u,v)=(1-f(u,v))O(u,v)+f(u,v)\;[S(u,v)+(1-s)D(u,v)]$$

when s=1 (maximum smoothing), $T(u,v)=S(u,v)$ when $f(u,v)=1$ (target surface is original "wrapped" to baseline surface model), and $T(u,v)=O(u,v)$ when $f(u,v)=0$ (target is original at the feathered edge). As s approaches 0 (minimum smoothing), $T(u,v)$ approaches $O(u,v)$ regardless of $f(u,v)$. In one embodiment, the surface described by $T(u,v)$ is then re-rasterized back into the canonical model, which is a voxel model.

The algorithm is implemented by performing the steps of tracing the outline on the isosurface, determining a baseline grid, interpolating to find $S(u,v)$, calculating $D(u,v)$, calculating $f(u,v)$, calculating $T(u,v)$, and re-rasterizing the result for incorporation into the canonical model.

The surface tug algorithm can be expressed as follows. In one embodiment, there is defined a point to influence $P_0$ 1320, $P_0=(x_0, y_0, z_0)$, a range of influence D, $D=(X_d, Y_d, Z_d)$, a radius of influence r 1330, and a single valued-distribution function $f(\omega)$ that maps the interval $[0,1]$ as a 1-to-1 mapping onto the interval $[0,1]$. See, for example, FIGS. 12, 13A, and 13B.

For any source point S 1310, given by $S=(x_s, y_s, z_s)$, find a target point T, given by $T=(z_t, y_t, z_t)$ such that: if $S=P_0$, then $T=P_0+D$, and if S is on or outside a sphere of radius r with center at $P_0$, then T=S (i.e., there is no change in S). In one embodiment, the effect within the sphere falls off with a "tapered" shape (i.e., the effect increases the closer one gets to $P_0$).

Another feature of the algorithm is expressed as follows:

Let $\alpha=\|S-P_0\|^2$ (representing distance squared)

In case 1 (see FIG. 13A):

$\alpha \geq r^2 => $ S is unchanged, or T=S.

In case 2 (see FIG. 13B):

$\alpha < r^2$

Let $\beta=\alpha^{(1/2)}=$ distance from S to $P_0$ and $\gamma$1340$=\beta/r=$ distance normalized to the interval [0,1]

Then let $$T=S+f(1-\gamma)D$$

Since $f(1)=1$, $T=P_0+D$ when $\gamma=0$. (This implies $S=P_0$)

In different embodiments, $f(\omega)$ will change for various effects and could be a discrete curve interpolated from any $\omega$ in [0,1].

In various embodiments, there are options for smoothing and related surface manipulation. One embodiment involves space warping. In some embodiments this can be accomplished using methods for moving a surface. In one embodiment, vertices are pushed. Such a method can involve resampling of polygons if high curvature exists, and does not prevent foldover. In one embodiment, volumes are resampled. This approach maintains valid volumes.

In one embodiment, a front propagates. This embodiment is a hybrid between a vertex-based method and a volumetric method. It is volumetric over a limited domain. Other embodiments involve warping by use of three-dimensional control points, such as a matrix or tri-cubic representation. Still other embodiments involve warping by use of a proxy object such as a point, a space curve, a polynomial expression, or the like.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A system for warping a three-dimensional virtual object, the system comprising:
   (a) a meshing module that creates an editable mesh corresponding to a portion of a surface of a three-dimensional virtual object;
   (b) an analytic module that modifies the editable mesh in response to a stimulus; and (c) a warping module that warps the three-dimensional virtual object to accommodate the modified editable mesh while substantially maintaining surface detail over the warped portion.

2. The system of claim 1, wherein the portion of the surface of the three-dimensional virtual object in (a) is user-selected.

3. The system of claim 2, wherein the portion in (a) is selected using a paint mechanism of a graphical user interface.

4. The system of claim 1, wherein the stimulus comprises a user command.

5. The system of claim 4, wherein the user command comprises a manipulation of a user interface device.

6. The system of claim 5, wherein the user interface device comprises at least one of a mouse, a computer keyboard, a touch screen, and a haptic interface device.

7. The system of claim 4, wherein the user command comprises a selection of a point of the editable mesh and a manipulation of the point in three-dimensional space.

8. The system of claim 7, wherein the analytic module modifies the editable mesh to maintain a surface that is fixed along its periphery and that contains the selected point.

9. The system of claim 8, wherein the analytic module modifies the editable mesh between its periphery and the selected point according to a falloff parameter.

10. The system of claim 8, wherein the analytic module modifies the editable mesh to define a peaked volume in response to a directional manipulation of the selected point of the editable mesh.

11. The system of claim 4, wherein the analytic module modifies the editable mesh according to multiple user commands.

12. The system of claim 1, wherein the editable mesh comprises at least one member of the group consisting of a polygonal set, a b-spline surface, a bezier surface, a procedural surface, and a NURBS representation.

13. The system of claim 1, wherein the editable mesh is visually differentiated from a surrounding portion of the surface of the virtual object.

14. The system of claim 1, wherein the three-dimensional virtual object comprises a volumetric representation of an object.

15. The system of claim 14, wherein the volumetric representation is a voxel-based representation.

* * * * *